US012054363B2

(12) United States Patent
Guymon et al.

(10) Patent No.: US 12,054,363 B2
(45) Date of Patent: Aug. 6, 2024

(54) SYSTEM AND METHODS FOR DETERMINING RELATIVE POSITION AND RELATIVE MOTION OF OBJECTS

(71) Applicant: J. RAY MCDERMOTT, S.A., Houston, TX (US)

(72) Inventors: David Lee Guymon, Katy, TX (US); Matthew McLean, Houston, TX (US); Jeremy Welty, Cypress, TX (US); Makenna Ryan, Houston, TX (US); Michael Middel, Cypress, TX (US)

(73) Assignee: J. Ray McDermott, Houston, TX (US)

( * ) Notice: Subject to any disclaimer, the term of this patent is extended or adjusted under 35 U.S.C. 154(b) by 274 days.

(21) Appl. No.: 17/424,299

(22) PCT Filed: Feb. 4, 2020

(86) PCT No.: PCT/US2020/016527
§ 371 (c)(1),
(2) Date: Jul. 20, 2021

(87) PCT Pub. No.: WO2020/163288
PCT Pub. Date: Aug. 13, 2020

(65) Prior Publication Data
US 2022/0089416 A1 Mar. 24, 2022

Related U.S. Application Data

(60) Provisional application No. 62/830,228, filed on Apr. 5, 2019, provisional application No. 62/801,305, filed on Feb. 5, 2019.

(51) Int. Cl.
*B66C 13/48* (2006.01)
*B63B 27/10* (2006.01)
*B66C 23/52* (2006.01)

(52) U.S. Cl.
CPC .............. *B66C 13/48* (2013.01); *B63B 27/10* (2013.01); *B66C 23/52* (2013.01); *B66C 2700/0371* (2013.01)

(58) Field of Classification Search
CPC . B66C 13/48; B66C 23/52; B66C 2700/0371; B63B 27/10
(Continued)

(56) References Cited

U.S. PATENT DOCUMENTS 3,799,505 A 3/1974 Duncan
4,147,330 A 4/1979 Eik
(Continued)

FOREIGN PATENT DOCUMENTS

CA 3128899 A1 * 8/2020 ............. B63B 27/10
CN 104781180 A 7/2015
(Continued)

OTHER PUBLICATIONS

International Search Report and Written Opinion dated Aug. 5, 2020 for Application No. PCT/US2020/016527.
(Continued)

*Primary Examiner* — Atul Trivedi
(74) *Attorney, Agent, or Firm* — Patterson + Sheridan, LLP

(57) ABSTRACT

System for determining relative positions and/or relative motions between objects (103, 602, 604). Disclosed systems include a target tracking device (110, 620, 622) on a first object (602) and an optical target on a second object (604). The target tracking device comprises a camera to take images of the optical targets which is configured to track the optical target. The system comprises an onshore crane (601), a ship system (700), an aviation system (800) or an offshore
(Continued)

crane (100). A controller (115, 615, 715, 815) controls the crane, a ship (701) or a helicopter (801) using the data from the tracking device.

20 Claims, 15 Drawing Sheets

(58) Field of Classification Search
USPC ............................................................. 701/21
See application file for complete search history.

(56) References Cited

U.S. PATENT DOCUMENTS

| | | | | |
|---|---|---|---|---|
| 5,089,972 | A | 2/1992 | Nachman et al. | |
| 6,115,129 | A | 9/2000 | Holmquist et al. | |
| 6,182,843 | B1 | 2/2001 | Tax et al. | |
| 6,826,452 | B1 | 11/2004 | Holland et al. | |
| 8,681,317 | B2 | 3/2014 | Moser et al. | |
| 9,041,595 | B2 | 5/2015 | Cameron et al. | |
| 9,815,668 | B2 * | 11/2017 | Morath | B66C 13/16 |
| 9,849,944 | B2 | 12/2017 | Foo et al. | |
| 9,902,596 | B2 | 2/2018 | Morrow et al. | |
| 10,308,327 | B1 | 6/2019 | Van Loon et al. | |
| 2006/0191457 | A1 | 8/2006 | Murphy | |
| 2007/0050115 | A1 | 3/2007 | Discenzo et al. | |
| 2012/0092643 | A1 | 4/2012 | Rintanen et al. | |
| 2012/0296519 | A1 | 11/2012 | Eberharter et al. | |
| 2013/0120577 | A1 | 5/2013 | Austefjord et al. | |
| 2013/0154869 | A1 | 6/2013 | Cameron et al. | |
| 2013/0245817 | A1 | 9/2013 | Schneider et al. | |
| 2013/0345857 | A1 | 12/2013 | Lee et al. | |
| 2014/0107971 | A1 * | 4/2014 | Engedal | B66D 1/52 702/150 |
| 2014/0284296 | A1 | 9/2014 | Appels et al. | |
| 2015/0112638 | A1 | 4/2015 | Morrow et al. | |
| 2015/0360887 | A1 | 12/2015 | Maij et al. | |
| 2015/0375836 | A1 | 12/2015 | van der Tempel et al. | |
| 2016/0031681 | A1 * | 2/2016 | Delplace | B66C 15/06 345/420 |
| 2016/0035120 | A1 * | 2/2016 | Delplace | G06T 19/20 345/473 |
| 2016/0035251 | A1 * | 2/2016 | Delplace | G09B 5/065 434/66 |
| 2016/0063709 | A1 | 3/2016 | Booij et al. | |
| 2016/0167932 | A1 * | 6/2016 | Holmberg | B66C 19/002 382/104 |
| 2016/0376848 | A1 | 12/2016 | Taraldrud et al. | |
| 2017/0096196 | A1 | 4/2017 | Foo et al. | |
| 2017/0120991 | A1 | 5/2017 | Wallin | |
| 2018/0141789 | A1 | 5/2018 | Rudy et al. | |
| 2018/0143011 | A1 * | 5/2018 | Rudy | B66C 23/76 |
| 2018/0244505 | A1 * | 8/2018 | Guymon | B63B 27/30 |
| 2018/0298754 | A1 * | 10/2018 | Kodaira | B63B 22/24 |
| 2018/0312225 | A1 | 11/2018 | Peleg et al. | |
| 2018/0370775 | A1 * | 12/2018 | Gong | B66C 13/16 |

FOREIGN PATENT DOCUMENTS

| | | | | | |
|---|---|---|---|---|---|
| CN | 105143088 | A | | 12/2015 | |
| CN | 104370229 | B | | 8/2016 | |
| CN | 107527475 | A | | 12/2017 | |
| CN | 109019345 | A | * | 12/2018 | B66C 13/16 |
| EP | 3323767 | A1 | * | 5/2018 | B66C 13/46 |
| GB | 2163402 | A | | 2/1986 | |
| JP | 85953394 | A | | 3/1984 | |
| JP | 07251949 | A | | 10/1995 | |
| JP | H1036071 | A | | 2/1998 | |
| JP | 2004175187 | A | | 6/2004 | |
| JP | 2012246130 | A | | 12/2012 | |
| JP | 2013147173 | A | | 8/2013 | |
| JP | 2016-193706 | A | | 11/2016 | |
| JP | 2018030714 | A | | 3/2018 | |
| JP | 2018115078 | A | | 7/2018 | |
| KR | 2015-0027105 | A | | 3/2015 | |
| WO | 2010/009570 | A1 | | 1/2010 | |
| WO | 2013015684 | A1 | | 1/2013 | |
| WO | 2015044898 | A1 | | 4/2015 | |
| WO | 2015087074 | A1 | | 6/2015 | |
| WO | WO-2016001481 | A1 | * | 1/2016 | B66C 13/16 |
| WO | WO-2017174196 | A1 | * | 10/2017 | B66C 13/063 |
| WO | WO-2018184871 | A1 | * | 10/2018 | |
| WO | 2018/228809 | A1 | | 12/2018 | |
| WO | WO-2021084231 | A1 | * | 5/2021 | B66C 13/063 |

OTHER PUBLICATIONS

Korrean Office Action issued to Patent Application No. 10-2021-7024974 on Jul. 26, 2023.

Australian Examination Report dated Aug. 29, 2022 for Application No. 2020218500.

Canadian Office Action issued to Patent Application No. 3, 128,899 on Nov. 16, 2022.

PCT/US2018/020203, International Search Report dated May 8, 2018, 3 pages.

Tordal, Sondre Sanden et al., "Relative Vessel Motion Tracking using Sensor Fusion, Aruco Markers, and MRU Sensors", Modeling, Identification and Control, vol. 38, No. 2, pp. 79-93.

Australian Examination Report dated May 7, 2020 for Application No. 2018227805.

Chinese Office Action dated May 7, 2020 for Application No. 201880014145.3.

Australian Examination Report dated Jul. 8, 2020 for Application No. 2018227805.

Australian Examination Report dated Oct. 19, 2020 for Application No. 2018227805.

Japanese Office Action dated Oct. 20, 2020 for Application No. 2019-547416.

Canadian Office Action dated Sep. 21, 2020 for Application No. 3,053,477.

Chinese Office Action dated Jan. 29, 2021 for Application No. 201880014145.3.

Korean Office Action dated Feb. 3, 2021 for Application No. 10-2019-7025837.

Australian Examination Report dated Mar. 23, 2021 for Application No. 2018227805.

European Office Action dated Apr. 22, 2021 for Application No. 18710697.6.

Notice of Acceptance dated May 12, 2021 for Application No. 2018227805.

Non-Final Office Action dated Dec. 13, 2019 for U.S. Appl. No. 15/908,479.

Final Office Action dated May 27, 2020 for U.S. Appl. No. 15/908,479.

Non-Final Office Action dated Nov. 12, 2020 for U.S. Appl. No. 15/908,479.

Final Office Action dated Mar. 17, 2021 for U.S. Appl. No. 15/908,479.

Japanese Patent Application No. 2021-544543 on Aug. 30, 2022.

Australian Examination Report dated Mar. 5, 2024 for Application No. 2023201477.

Chinese Office Action dated Sep. 15, 2023 for Application No. 202080027467.9.

Mizuchil Yoshiaki et al.: "Camera-based measurement for close-distance relative vessel positioning", Journal of Mechanical Science and Technology, Springer, DE, vol. 31, No. 4, Apr. 23, 2017 (Apr. 23, 2017) , pp. 1899-1907, XP036217668, ISSN: 1738-494X, DOI: 10.1007/S12206-017-0338-3 [retrieved on Apr. 23, 2017].

European Office Action issued to patent application No. 20709844.3 on May 6, 2024.

Chinese Office Action dated May 31, 2024 for Application No. 202080027467.9.

* cited by examiner

SYSTEM AND METHODS FOR DETERMINING RELATIVE POSITION AND RELATIVE MOTION OF OBJECTS

CROSS-REFERENCE TO RELATED APPLICATIONS

This application claims benefit of U.S. provisional patent application Ser. No. 62/830,228, filed Apr. 5, 2019, and U.S. provisional patent application Ser. No. 62/801 305, filed Feb. 5, 2019; each of which is herein incorporated by reference.

BACKGROUND

Field

Aspects of the present disclosure relate generally to systems and methods for determining relative position and relative motion between objects and/or bodies.

Description of the Related Art

Many industrial operations involve varying positions and movements of objects. Such operations can involve marine transportation, offshore oil and gas activities, cargo transfer, and aviation activities. For example, there can be two floating vessels whose relative positions and motions vary under changing sea conditions, such as heave, surge, sway, pitch, roll, and yaw from the ocean. The varying relative positions and motions can cause the two floating vessels to drift closer and further apart, For vessels working in proximity to other structures, vessels, or floating bodies it can be of concern that the relative offset or space between the vessels and objects is carefully controlled and maintained steady. For example, a ship using a crane to land an object onto another floating body requires the two bodies to be coupled together, or for each to maintain steady position. It is common for large floating facilities to be moored on chains or ropes in position, and for a vessel coming in proximity to a floating facility to maintain a fixed offset from the moored facility subject to movement from weather conditions.

The relative positions and/or movements of objects can be difficult and costly to determine. For example, efforts to manually determine the relative positions or movements of objects have incurred error, substantial time, and language barriers. Efforts to determine the relative positions or movements of objects have also been limited in that the efforts account for only one or two degrees of freedom for the bodies. Such limitations lead to more references needed and increase the opportunity for failure.

Therefore, there is a need for an accurate system and method that determines relative positions and motions between objects in a timely and cost-effective manner.

SUMMARY

Implementations of the present disclosure generally relate to systems and methods for determining relative positions and relative motions between objects and/or bodies.

In one implementation, an onshore crane system includes one or more optical targets for disposal on one or more objects, and a target tracking device for disposal on an onshore crane. The target tracking device is configured to track the one or more optical targets, and the target tracking device includes a camera configured to take one or more images of the one or more optical targets. The onshore crane system includes a controller that is configured to receive data from the target tracking device, and control the onshore crane using the data received from the target tracking device.

In one implementation, a ship system includes one or more optical targets for disposal on an object, and a target tracking device for disposal on a vessel. The target tracking device is configured to track the one or more optical targets, and the target tracking device includes a camera configured to take one or more images of the one or more optical targets. The ship system includes a controller that is configured to receive data from the target tracking device, calculate a relative motion between the target tracking device and the one or more optical targets using the data received from the target tracking device, and control the vessel using the relative motion.

In one implementation, an aviation system includes an optical target for disposal on an object, and a target tracking device for disposal on a helicopter. The target tracking device is configured to track the optical target, and the target tracking device includes a camera configured to take one or more images of the one or more optical targets. The aviation system includes a controller that is configured to receive data from the target tracking device, calculate a relative motion between the target tracking device and the optical target using the data received from the target tracking device, and control the helicopter using the relative motion.

In one implementation, an offshore crane system includes one or more optical targets for disposal on a first vessel, and a target tracking device for disposal on a crane disposed on a second vessel. The target tracking device is configured to track the one or more optical targets, and the target tracking device includes a camera configured to take one or more images of the one or more optical targets. The offshore crane system includes a controller that is configured to receive data from the target tracking device, and control the crane using the data received from the target tracking device.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only common implementations of this disclosure and are therefore not to be considered limiting of its scope, for the disclosure may admit to other equally effective implementations.

Figure 1A:
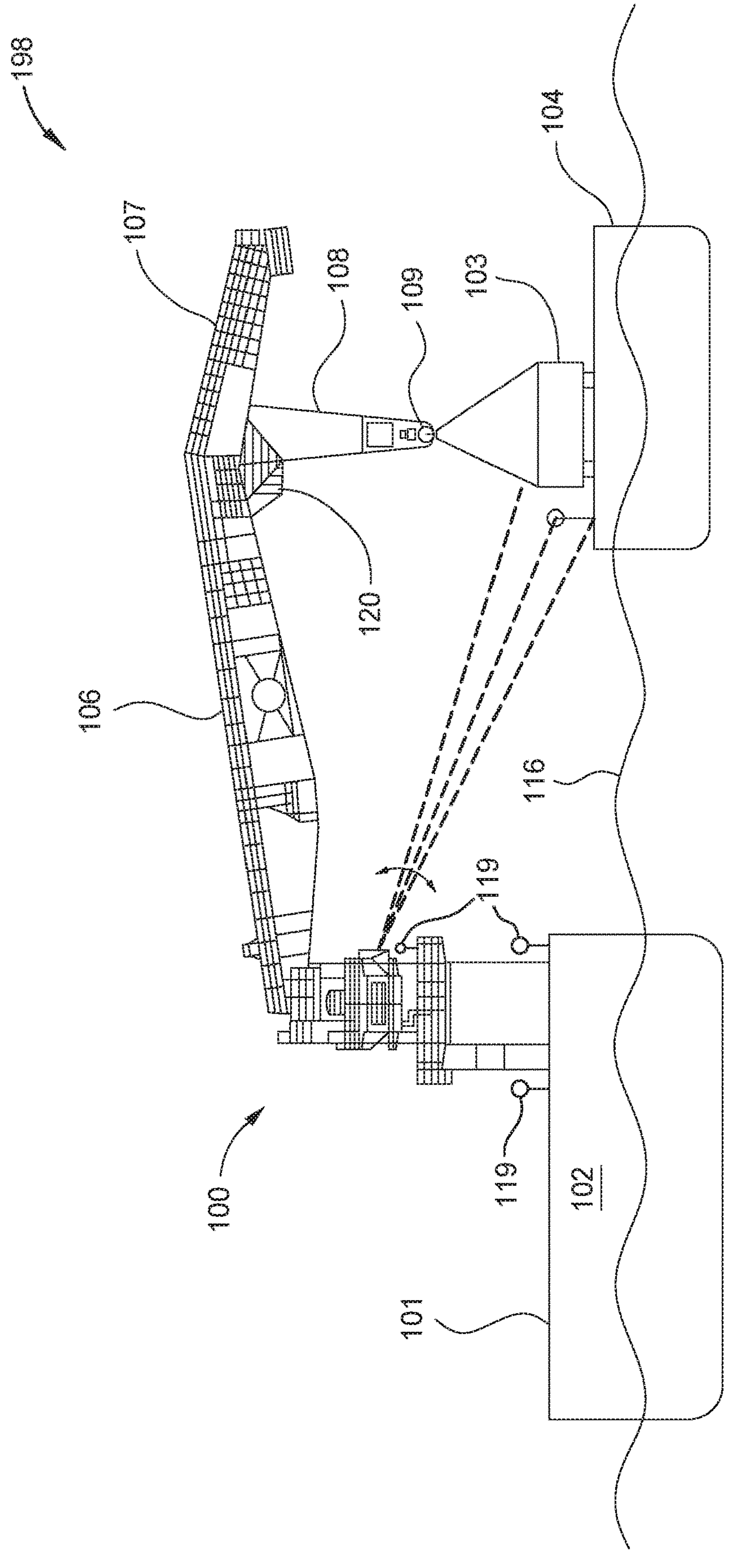
FIG. 1A schematically and partially illustrates an offshore crane system, according to an implementation of the disclosure.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

The present disclosure relates to systems and methods for determining relative positions and relative motions between objects and/or bodies.

Aspects of the disclosure include systems for, and methods of, determining relative positions of objects. Disclosed systems include a target tracking device mounted on or near a first object at a first location, and a target located at a second location on or near a second object. The target tracking device and the target facilitate real time determination of relative motion between the two locations. Methods of using the same are also disclosed.

Figure 1C:
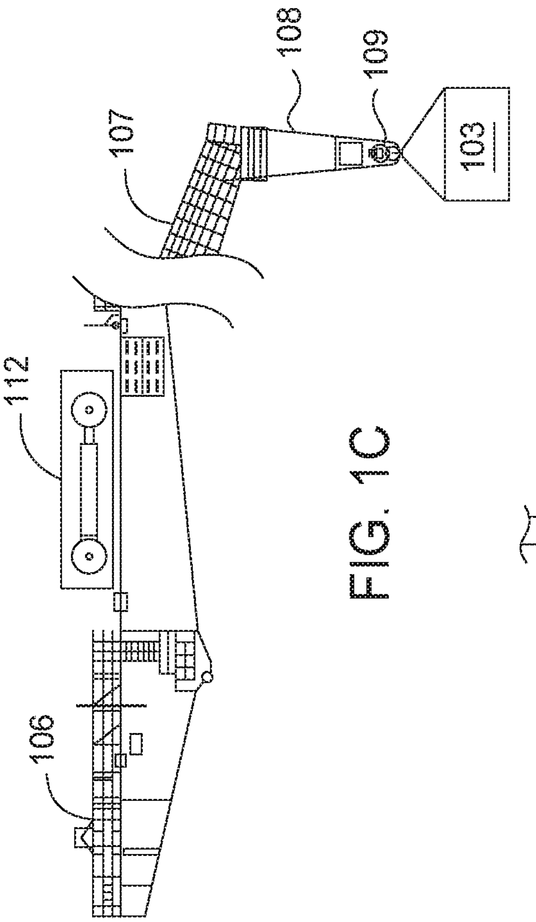
FIGS. 1B and 1C are enlarged partial views of FIG. 1A.
Figure 1B:
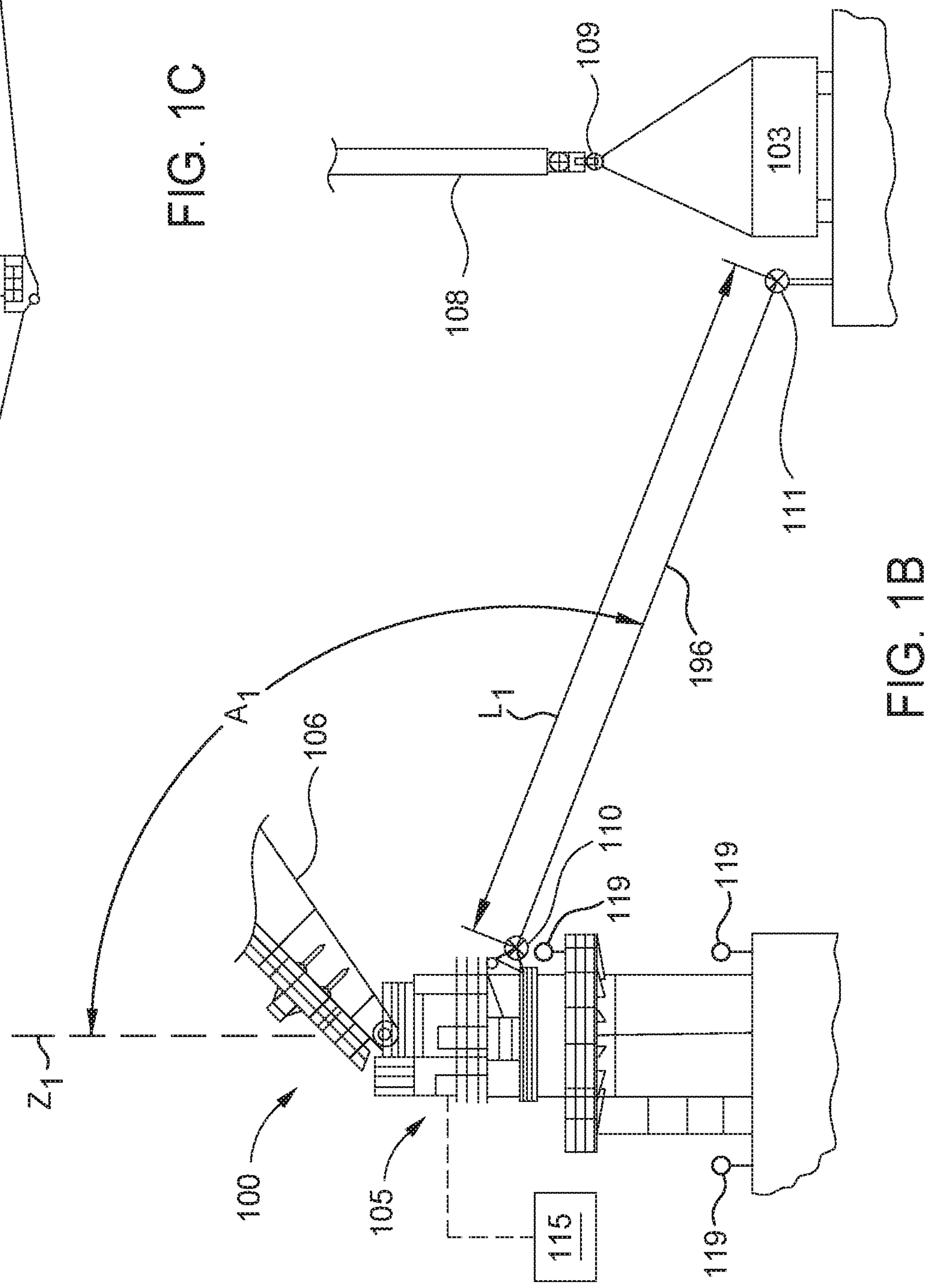

FIG. 1A schematically and partially illustrates an offshore crane system 198, according to an implementation of the disclosure. FIGS. 1B and 1C are enlarged partial views of FIG. 1A. As illustrated, the crane 100 is positioned on a deck 101 of a first vessel 102 located in a body of water 116. The crane 100 is configured to position an object 103 on, or remove an object 103 from, a second vessel 104 located adjacent to the first vessel 102. The object 103 is alternatively referred to herein as the load. The crane 100 includes at least an operator cab 105, a boom 106, a jib 107, a hoist line 108, and a hook 109. The crane 100 may be mounted on a pedestal to facilitate rotational movement of the crane 100, or to facilitate coupling with the deck 101 of the first vessel 102. An optional carriage 120 travels along the boom 106 and the jib 107 to laterally move the hoist line 108 and the hook 109 coupled thereto.

To facilitate transfer of the object 103 by accounting for relative motion between the first vessel 102 (and thus, the crane 100) and the second vessel 104, a target tracking device 110 is utilized. The target tracking device 110 is an instrument that accurately measures the position of an optical target 111, which may be positioned on or adjacent to an object, such as object 103. The target tracking device 110 is mounted on the operator cab 105 of the crane 100 or adjacent the operator cab 105. Mounting locations other than the operator cab 105, such as on the deck 101, may be used. The target tracking device 110 may be disposed at any location at or near the first vessel 102. The optical target 111 is mounted on the second vessel 104 near the object 103 (or near a location at which the object 103 is to be positioned). Thus, as the target tracking device 110 tracks the optical target 111, tracking of the second vessel 104 relative to the target tracking device 110 (and correspondingly, the crane 100 and the first vessel 102) occurs. In one example, the target tracking device 110 includes a laser. In one example, the target tracking device 110 includes a camera, One or more reference targets 119 may be disposed on the first vessel 102, for example on the crane 100, for the target tracking device 110 to determine a position of the target tracking device 110 relative to aspects of the first vessel 102 and/or aspects of the crane 100. The reference targets 119 are similar to the optical target 111 and may include one or more of the same features, aspects, components, and/or properties thereof. The target tracking device 110 may scan to detect and determine relative positions of the reference targets 119 to determine the position of the target tracking device 110 prior to tracking the optical target 111. The reference targets 119 may be disposed at a known relative position and/or a known distance relative to the optical target 111.

The present disclosure contemplates that the positions of the target tracking device 110 and the optical target 111 may be switched such that the target tracking device 110 and the reference targets 119 are disposed on the second vessel 104 and the optical target 111 is disposed on the first vessel 102. In such an example, an optical target 111 may be placed on the crane 100, such as near or on the tip of the crane 100, such that the target tracking device 110 can track relative motion of the crane 100 relative to the second vessel 104.

The target tracking device 110 may be configured to switch between tracking the crane 100 and a second crane on a third vessel, and/or additional cranes on other vessels. The target tracking device 110 may also be configured to simultaneously tracking the crane 100 and a second crane on a third vessel, and/or additional cranes on other vessels. In one example, the crane 100 is a first crane, and the offshore crane system 198 includes a second crane and a third crane disposed on the first vessel 102. The target tracking device 110 includes a single camera and is mounted on the first vessel 102 at a location offset from the operator cabs of the first crane 100, the second crane, and the third crane. The single camera of the target tracking device 110 may be configured to switch between tracking the first crane 100, the second crane, and the third crane. The single camera of the target tracking device 110 may also be configured to simultaneously track the first crane 100, the second crane, and the third crane. In one example, the optical target 111 is a spherically mounted retroreflector (SMR), which resembles a ball bearing with mirrored surfaces formed thereon. In another example, the optical target 111 is an optical grid of alternating squares which are recognizable by the target tracking device 110. It is to be noted that other shapes, such as triangles or circles, which are distinguishable by the target tracking device 110 may be utilized for the optical grid. Further, the optical target 111 may also be a different type of marker which is recognizable by the target tracking device 110.

The target tracking device 110 is configured to facilitate determination of a distance $L_1$ between the target tracking device 110 and the optical target 111, for example, via one or more images taken of the optical target 111. In addition, the target tracking device 110 may also simultaneously facilitate determination of an angle $A_1$ of a line of sight (e.g., a direct line 196 between the target tracking device 110 and the optical target 111) relative to a vertical axis $Z_1$ of the operator cab 105 or other reference axis. It is contemplated that additional axes and/or other coordinate systems may be utilized, including a three-dimensional axis system.

In one example, servo motors within the target tracking device 110 continuously orient the target tracking device 110 towards the optical target 111 in response to relative movement therebetween. A trigonometric calculation is performed to calculate the height of the object 103 above the optical target 111 and the distance therebetween. The determination of the distance between the target tracking device 110 and the optical target 111, the distance between the object 103 and the optical target 111, and the angle $A_1$ of the line of sight 196 of the target tracking device 110 to the optical target 111 relative to an axis, such as the axis $Z_1$ of the operator cab 105, are used to determine relative motion between the first vessel 102 and the second vessel 104.

In one example, the target tracking device 110 facilitates determination of a distance between the shapes of an optical grid used as the optical target 111. The shapes are distinguishable by the target tracking device 110. The distance between the shapes, or the sizes thereof, is used by the target tracking device 110 to facilitate determining the distance between the optical target 111 and the target tracking device 110. For example, a distance between the shapes may be known. The target tracking device 110 is configured to facilitate measuring a distance between the shapes and relating the measured distance between the shapes to the known distance between the shapes to determine the distance of the optical target 111 from the target tracking device 110.

The target tracking device 110 may also facilitate determining a rotational motion of the optical target 111. In one example, the target tracking device 110 facilitates determining relative rotation of the optical target 111 by facilitating determination of distances between the objects used to form the optical grid of the optical target 111 and/or image matching images of the said optical grid to images of optical grids of a known relative rotation. The determined rotational motion of the optical target 111 can be used to determine the rotation of an object offset therefrom, such as the object 103 or a landing area on the deck of a vessel.

Processing of data, including performance of calculations, is performed by a controller 115 or other computing device. In one example, the controller 115 is located within the operator cab 105 and displays information to the operator on a display. The controller 115 may be located in other locations of the offshore crane system 198, such as a location of the first vessel 102, the deck 101 of the first vessel 102, a bridge of the first vessel 102, or on or under a helipad of the first vessel 102. The controller 115 is disposed adjacent the target tracking device 110. The controller 115 can include a central processing unit (CPU), support circuitry, and memory containing associated control software. The controller 115 may be one of any form of a general purpose computer processor that can be used in an industrial setting. The CPU may use any suitable memory, such as random access memory, read only memory, floppy disk drive, compact disc drive, hard disk, or any other form of digital storage, local or remote. Various support circuits may be coupled to the CPU for supporting the offshore crane system 198. The controller 115 may be coupled to another controller that is located adjacent individual chamber components. Bi-directional communications between the controller 115 and various other components of the offshore crane system 198 are handled through numerous signal cables collectively referred to as signal buses. The display may optionally be a touch-screen panel, allowing an operator to interact with the display, the controller 115, and the target tracking device. In one example, the display may be a heads-up display (HUD).

The present disclosure contemplates that aspects of the offshore crane system 198 may be part of, tie into, or communicate directly with control system aspects of the crane 100, such as aspects that control positioning and movement of the crane 100. As an example, the controller 115 may send instructions based on the determined relative motion that instruct the crane 100 to move the crane 100 to a specified position at a specified velocity. Hence, the offshore crane system 198 can automatically control positioning and movement of the crane 100 and the operator can disrupt the automatic positioning using manual operation, such as manual manipulation of a joystick.

The target tracking device 110 and the optical target 111 allow the relative velocity (e.g., a change in the measured relative position over a period of time) between the first vessel 102 and the second vessel 104 to be determined. Measuring a change in relative position over a period of time also allows the relative acceleration between first vessel 102 and second vessel 104 to be determined. The determinations of relative velocity and/or relative acceleration allow assessment as to whether the motion between the first vessel 102 and the second vessel 104 is within a specified operational range corresponding to particular lift, such as a given load and size thereof. Additionally, the relative velocity, the relative acceleration, and/or the relative motion between the first vessel 102 and the second vessel 104 can be used to determine a derating factor of a crane and a lifting capacity thereof based upon the relative motion. Determining relative velocity and/or relative acceleration facilitates accurate and quick determinations of operating parameters for lifting operations and landing operations, such as the derating factor, the lifting capacity, and/or the weather window. Determining relative velocity and/or relative acceleration facilitates determinations of operating parameters prior to operating the crane 100, the first vessel 102, and/or the second vessel 104 to conduct the lifting operation or landing operation. The operating parameters may be determined prior to locating the first vessel 102, the crane 100, and/or the second vessel 104 into position to conduct the lifting operation or landing operations. In one example, the operating parameters are determined when the second vessel 104 is at a distance too far for the crane 100 to yet conduct the lifting operation or landing operation. Determining relative velocity and/or relative acceleration facilitates accurate and quick determinations of operating parameters relative to relying on wave height and/or weather forecasts to assess or predict the operating parameters.

Traditionally, heave compensators and associated systems act on the hoist or a cylinder in reeving of the hoist line 108. With reference to FIG. 1C, the crane 100 includes an exemplary active heave compensator 112 representatively coupled to the boom 106. It is contemplated that the boom 106 may include an active heave compensator 112 integrated therewith, or that the boom may be retrofitted with an active heave compensator 112, as shown. The active heave compensator 112 may also be installed elsewhere, such as within the crane pedestal or even within the first vessel 102, so as long as the active heave compensator 112 is in contact with the hoist line 108. The active heave compensator 112 includes one or more motors, hydraulic pumps, accumulators, and/or gas systems to facilitate active heave compensation during lifting operations. The active heave compensator 112 receives signals from the controller 115. The controller 115 instructs the active heave compensator 112 to perform adjustment operations, in response to data determined and/or provided by the target tracking device 110 or data received or computed by the controller 115, to reduce relative movement between the object 103 and the second vessel 104 during a lifting operation. The operations performed by the active heave compensator 112 result in substantially synchronous movements between the object 103 and deck of the second vessel 104, particularly at the location of the optical target 111, thereby reducing or eliminating impact of the load, and increasing the available operational window for performing operations. For example, conventionally, load sizes for lifting are limited due to wave height of the body of water 116 which causes relative motion between the first vessel 102 and the second vessel 104. However, methods and systems herein allow for increased operational windows by allowing lifting of a load at increased wave heights (i.e., increased relative motion between two vessels) compared to conventional techniques. It is contemplated that the active heave compensation may be accomplished by heave compensation operations of the hoist (i.e., winch) coupled to the hoist line 108 of the crane 100 in response to signals received from the controller 115.

The target tracking device 110 may facilitate determining relative motion between the first vessel 102 and the second vessel 104 without active heave compensation being applied. For example, the target tracking device 110 can facilitate determining relative motion between the vessels to aid an operator in determining a derating factor of the lifting capacity of the crane 100 in relation to the determined relative motion. The derating factor may be determined by a control system automatically or may be determined by an operator using a derating chart based upon relative velocity, relative acceleration, and/or relative motion. Additionally, although the crane 100 and the first vessel 102 are illustrated as being located on a fixed offshore structure, it is contemplated that the crane 100 may alternatively be located onshore or on a fixed offshore structure. In such examples, the crane 100 may be mounted on a mobile platform, such as a truck or a quay, or may be fixed in position. The crane 100 may also be mounted to a jack-up crane barge, a jack-up offshore platform, or a floating offshore platform.

It is contemplated that targets other than the optical target 111 may be utilized according to implementations of the present disclosure. The optical target 111 may include other reflective materials, or may vary in size, quantity, and shape.

It is contemplated that more than one optical target 111 may be utilized. In one example, a second optical target, such a laser or an optical grid, can be output from additional sources with signatures, such as wavelengths or grid patterns, identifiable by the target tracking device 110. Such a configuration may be useful when an optical target 111 is to be placed in a hazardous environment, such as an area under a hanging load (e.g., directly beneath the object 103 during landing or lift-off). A person located on a working deck, such as the deck of the second vessel 104 could use an optical target source, such as a laser pointer, to direct the target tracking device 110 onto a second optical target (e.g., the operator could "paint" a target to be recognized by the target tracking device 110). Once the target tracking device 110 recognizes the second optical target, the position of the second optical target is registered for future tracking by the target tracking device 110 and for viewing in a display of the operator cab 105. The second optical target may also be a series of coordinate points input into the system which are recognizable by the target tracking device 110.

Once a target is registered, the target can be stored by a memory of the offshore crane system 198 (such as a memory of the controller 115) and thus does not require continued illumination with the laser pointer by an operator. For example, the target may be stored as an image to be image matched by the controller. Thus, the targets can be stored for operations beyond the immediate lift-off or landing operation. In doing so, the stored targets (viewable on a crane operator display, such as an HUD) may provide visual landmarks to which a crane operator can navigate the hook 109 or an object 103 suspended therefrom. Thus, the hook 109 can be guided into positions normally not navigable, or at least unnavigable without a likelihood of inadvertent collision between the hook 109 and surrounding items. The hook 109 may be guided into a desired position manually, semi-manually (i.e., computer assisted), or autonomously.

It is contemplated that such functionality is beneficial to and applicable to both offshore operations and operations where one or more of the crane 100, first vessel 102, second vessel 104 and/or the object 103 are fixed or moving, and/or onshore or offshore. While methods and systems are described herein in the context of offshore operations, onshore operations are also contemplated and described. Additionally, operations are also contemplated and described that relate to equipment other than, or in addition to, cranes.

Figure 2A:
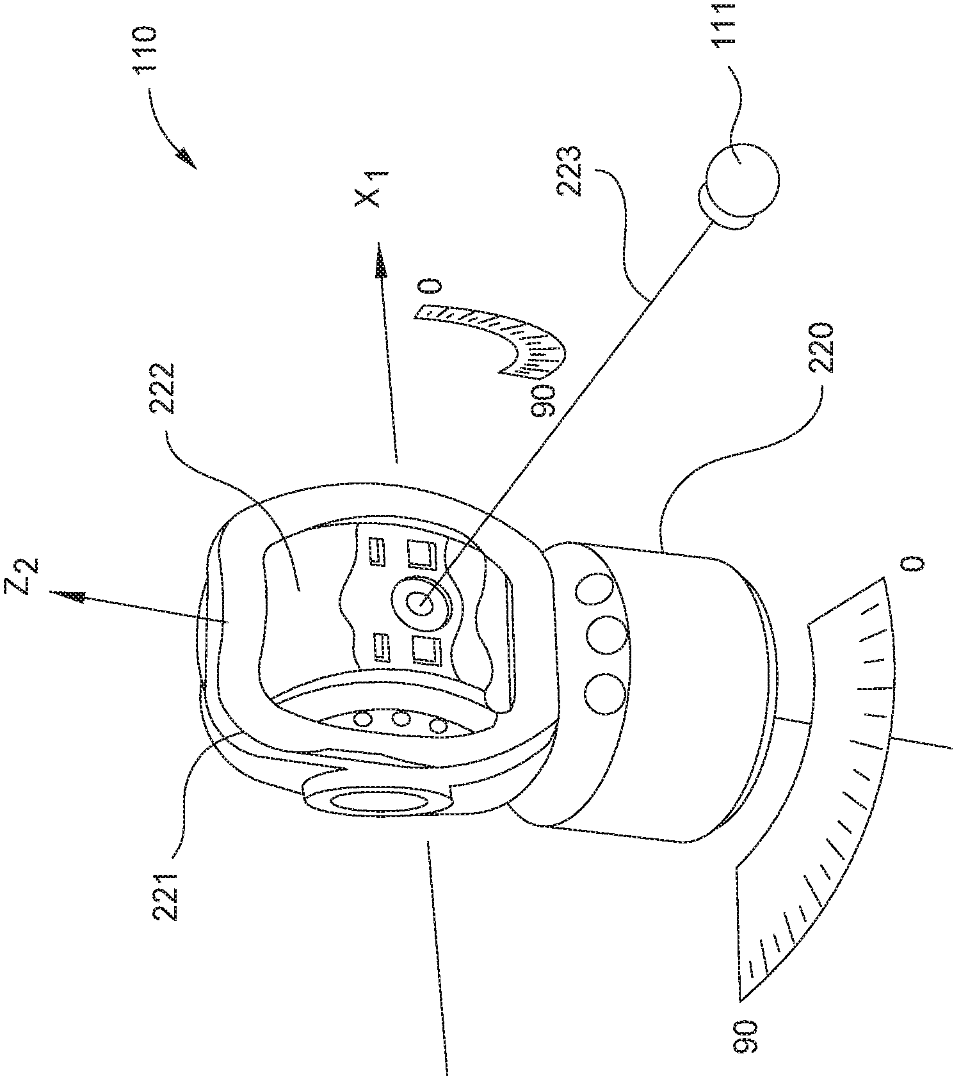
FIG. 2A is a schematic partial illustration of a target tracking device, according to an implementation of the disclosure.

FIG. 2A is a schematic partial illustration of a target tracking device 110, according to an implementation of the disclosure. The target tracking device 110 includes a four-axis camera that is configured to take one or more images of optical targets, such as the optical target 111 track the optical targets using video tracking and/or image tracking. The four-axis camera includes four axes of movement. The additional axis of movement over traditional cameras, such as one or two axis cameras, facilitates compensation of movement of an object to which the camera is mounted, e.g., a helicopter or offshore vessel. An exemplary camera that may be utilized herein is the SWE-300LE available from Trakka Systems USA, Bradenton, FL. In one example, the camera is a high definition camera. In one example, the camera includes a resolution of 1280 pixels×920 pixels. Other cameras and other target tracking devices may be utilized. The present disclosure contemplates that the four-axis camera may be used on offshore systems and aviation systems, and that a different camera—such as a two-axis camera or a one-axis camera—may be used for onshore systems such as the onshore crane system 600 described below.

The target tracking device 110 includes a base 220, a rotating mount 221, and an optical unit 222. The base 220 is configured to be mounted on a surface, such as an exterior surface of the operator cab 105 of a crane 100. The base 220 may be mounted on locations other than the operator cab 105, such as on the deck 101. The rotating mount 221 is mounted on the base 220 and rotates about a vertical axis $Z_2$. The optical unit 222 is positioned within the rotating mount 221, and rotates therein about an axis $X_1$. In one example, the target tracking device 110 includes an inertially-compensated gimbal. In one example, the target tracking device 110 includes a four-axis gyro stabilized gimbal. The optical unit 222 may include a laser generating source therein which projects a laser 223 toward the optical target 111. The present disclosure contemplates that the laser generating source and the laser 223 may be omitted. In such an example, relative distances, positions, and/orientations may be determined using the camera, by equating a number of pixels in a camera image to a known dimension on target, such as an April tag. The optical unit 222 includes a camera with a camera lens. The target tracking device 110 adjusts the relative positions of the rotating mount 221 and an optical unit 222 to continuously direct a line of sight 196 and/or the laser 223 of the target tracking device 110 at the optical target 111 in response to movement therebetween. The laser 223 may be reflected from the optical target 111, such as a spherically mounted retroreflector (SMR), and received by the optical unit 222 to facilitate determination of distance between the target tracking device 110 and the optical target 111. The optical unit 222 may also house one or more instruments therein, such as an accelerometer, a motion reference unit (MRU), an inertial measurement unit (IMU), and/or an encoder, to facilitate determining a relative angle between the line of sight 196 and/or the laser 223 and the vertical axis $Z_2$ (or another axis). Information such as relative angle and distance to the optical target 111 are provided to a controller, such as the controller 115, to perform calculations for active heave compensation, relative movement of one or more objects, or other operations.

In one embodiment, which can be combined with other embodiments, the target tracking device 110 includes a camera in addition to or in place of the laser. In addition to providing relative motion of objects, the camera provides a video image and/or photographic image of the relative motion seen by the camera. In an example, the optical unit 222 of the target tracking device 110 may be replaced with an optical viewer, such as a camera system, which is configured to recognize the optical target 111. The target tracking device 110 may use a combination of laser tracking and camera systems.

In one example, the target tracking device 110 has an optical viewer with a defined field of view. The optical target 111 is maintained within the field of view of the target tracking device 110. The relative position of the optical target 111 within the field of view of the target tracking device 110, and the changes in relative position of the optical target 111 over a period of time, are used by the target tracking device 110 to facilitate determining the relative motion between the first vessel 102 and the second vessel 104, and/or a distance of the optical target 111 from the target tracking device 110. In one example, two target tracking devices 110 with optical viewers are used. Each target tracking device 110 is directed towards the optical target 111. A controller, such as an onboard controller of the target tracking device 110 and/or the controller 115, compares the detected image from each target tracking device 110 to determine a distance of the optical target 111 from the target tracking devices and/or a relative motion of the optical target 111.

By being capable of moving, such as by rotating about at least two axes, the target tracking device 110 can render quality tracking measurements and images with accuracy, and can do so using a single target tracking device 110. The target tracking device can also account for movement and vibration of the object, such as the operator cab 105 of the crane 100, on which the target tracking device is disposed.

Figure 2B:
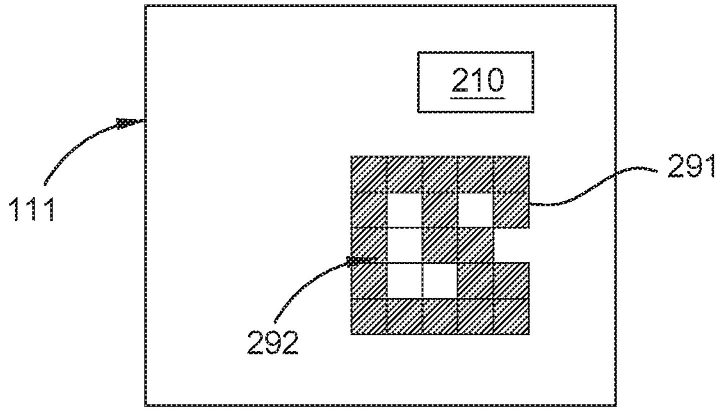
FIG. 2B is a schematic partial illustration of an optical target, according to an implementation of the disclosure.

FIG. 2B is a schematic partial illustration of an optical target 111, according to an implementation of the disclosure. The optical target 111 may include one or more of the aspects, features, and/or components described above or below. The optical target 111 includes a first tag 291 having a first tag pattern 292 that the target tracking device 110 is configured to recognize within one or more images to identify the optical target 111 within the images. The first tag pattern 292 includes an April tag that includes a pattern of black shapes, such as black boxes in a predetermined configuration, on a white background. The first tag pattern 292 includes a first set of shapes recognizably contrasted with a second set of shapes. In one example, the first tag pattern 292 includes black shapes printed on white paper. In such an example, the black shapes are part of the first set of shapes and the second set of shapes are white. The first tag pattern 292 may include other materials, shapes, and/or colors. In one example, the first tag pattern 292 includes shapes painted on a surface of an object.

In one example, the optical target 111 includes a radio frequency identification (RFID) tag 210. The RFID tag 210 is configured to transmit to a radio frequency antenna (e.g., an RF tag reader) information related to an object associated with the optical target 111, such as an object on which the optical target 111 is disposed. The information includes one or more of a vertical position of the object, a horizontal position of the object, an as-built weight of the object, dimension(s) of the object, rigging certification information of the object, and/or position offsets between the RFID tag 210 and the object. In one example, the RFID tag 210 provides horizontal position information and/or vertical position information of an optical target 111 that is outside of a field of view of the target tracking device 110 illustrated in FIG. 2A. The RFID tag 210 facilitates adjusting the target tracking device 110 to locate the optical target 111 that is outside of a field of view of the target tracking device 110. In one example, a radio frequency antenna associated with the target tracking device 110 and/or a controller 115 receives a radio frequency signal transmitted by the RFID tag 210. Based on the strength and/or direction of the radio frequency signal received by the radio frequency antenna, the controller 115 can determine an approximate location of the RFID tag, and thus, of the optical target 111 coupled thereto. The target tracking device 110 can then be instructed by the controller 115 to begin scanning the approximate location identified based on the received radio frequency signal. Thus, acquisition time of the optical target is greatly reduced by narrowing the scanning field to the approximate location. In such an embodiment, it is contemplated that one or more RF antennas may be utilized. Additionally or alternatively, the one or more RF antennas may be configured to move or rotate to facilitate location of the RFID tag 210.

Figure 2C:
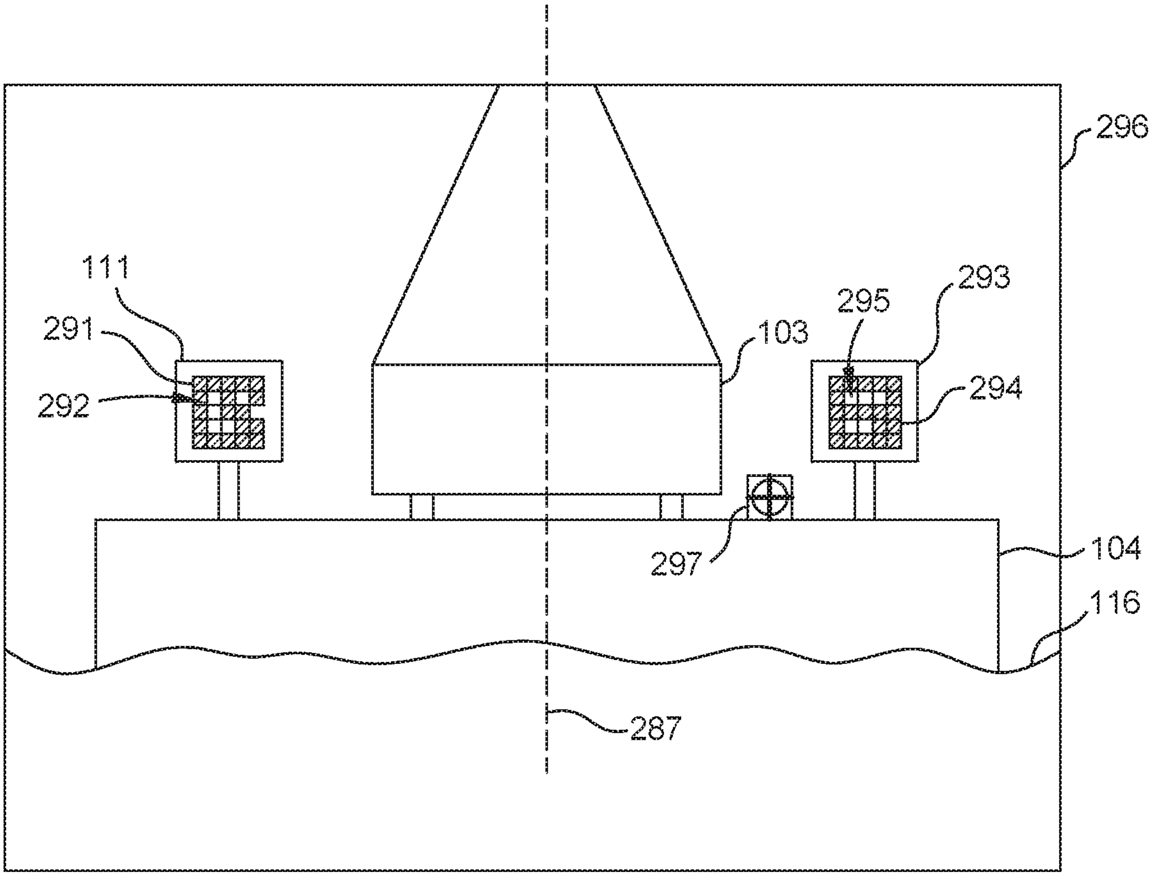
FIG. 2C is a schematic partial illustration of an image taken by the target tracking device illustrated in FIG. 1A of the optical target and a second optical target, according to an implementation of the disclosure.

FIG. 2C is a schematic partial illustration of an image 296 taken by the target tracking device 110 illustrated in FIG. 1A of the optical target 111 and a second optical target 293, according to an implementation of the disclosure. The image 296 is within the field of view of the camera of the target tracking device 110. The optical target 111 is a first optical target. The second optical target 293 includes a second tag 294 having a second tag pattern 295 that the target tracking device 110 is configured to recognize within one or more images to identify the second optical target 293 within the image 296 and distinguish between the second optical target and the first optical target 111. The second tag pattern 295 includes an April tag that includes a pattern of black shapes, such as black boxes, on a white background. In one example, the second tag pattern 295 includes black shapes printed on white paper. The second tag pattern 295 is different than the first tag pattern 292, for example by including different black objects at different locations along the white background of each tag 291, 294.

The target tracking device 110 uses features within the image 296 to facilitate determining relative motion of the second vessel 104 and/or the object 103 relative to the first vessel 102. In one example, the positions of the first optical target 111 and the second optical target 293 within the image 296 are used to determine relative motion of the first optical target 111 and the second optical target 293. The pixels occupied by features within the image 296, for example the pixels occupied by features of the first optical target 111, may be used to determine the relative motion of features within the image 296. For example, a controller can determine pixel displacement of the tag in a captured image. When using a known tag, such an April tag, dimensions of the tag are known, and therefore, the pixels which occupy the tag (or a portion thereof are known), establishing a scale between pixels in an image and a physical measurement to determine relative distance traveled by the tag (and the object to which the tag is adhered). In one embodiment, which can be combined with other embodiments, a single camera is used to track the first optical target 111 and the second optical target 293. A reference point, such as reference point 297, may be set for tracking such that the target tracking device 110 tracks the reference point 297 relative to the target tracking device 110, based upon image capturing of the first optical target 111 and/or the second optical target 293. The reference point 297 is offset from the first and second optical targets 111, 293, such as between the first and second optical targets 111, 293 and/or set at known distances from the first and second optical targets 111, 293. In one example, the reference point may be in a different plane than a plane defined by the first optical target 111 and the second optical target 293. In one example, the reference point 297 may be in a visually obscured location, but may be consistently and accurately tracked using the first optical target 11 and the second optical target 293. Such an example facilitates operations in visually-obscured locations. Known data, such as a known relative position of the second optical target 293 relative to the first optical target 111 and/or a known distance between the first and second optical targets 111, 293, may be used to track relative motion of the reference point 297 relative to the target tracking device 110.

The present disclosure contemplates that a plurality of optical targets in addition to the first and second optical targets 111, 293 may be used. The target tracking device 110 may be configured to switch between different optical targets 111, 293 to track the targets individually. The target tracking device 110 may also be configured to track the targets simultaneously, which facilitates determination of orientation of an object to which multiple targets are attached, and/or facilitates three-dimensional tracking/rendering/processing. In one example, six additional optical targets are disposed on the second vessel as part of eight optical targets of the plurality of optical targets. A plurality of optical targets may be used to create a tag array that spans the gaps and distances between the optical targets. The tag array—including the combined optical targets where each optical target is disposed at a distance from another optical target—may act as a single target having a size that is larger than a size of the optical targets if the optical targets were placed together such that each optical target contacts another optical target. The tag array having the larger size facilitates accurate and quick three-dimensional tracking in up to six degrees of freedom. Spacing the plurality of optical targets such that each optical target is at a distance from another optical target facilitates accurate and quick measurements with less noise for a controller (such as the controller 115) to filter out when making determinations such as relative motion determinations. In one example, the controller (such as the controller 115) is programmed to use pairs of optical targets for error checking. The controller may also use redundancy across optical targets of a tag array in case a portion of one or more of the optical targets is obscured. In one example, redundancy across optical targets is used when a shadow partially obscures white shapes of the first tag pattern 292 to obscure the contrast between the white shapes and the black shapes.

In one example, a threshold number of targets may be set for the offshore crane system 198. The offshore crane system 198 outputs an error message and/or a warning message to an operator, such as an operator within the operator cab 105, if one or more optical targets are outside of the field of view of the camera such that the number of optical targets detected within the image 296 falls below the threshold number of targets. The operator may facilitate moving the camera to move the field of view such that the number of optical targets detected within an image exceeds or is equal to the threshold number of targets, or the camera may be instructed by a controller to autonomously scan when the camera image includes less than the threshold number of targets. In one example, eight optical targets are disposed on the second vessel 104 and the threshold number of targets is set to be six optical targets, however, other threshold values, such as one or two, are contemplated. In such an example, the warning message and/or the error message is output if the number of optical targets detected within the image 296 is five or less. In one example, the warning message and/or the error message is output to an operator by displaying the warning message and/or the error message on a heads-up display (HUD).

The target tracking device 110 described facilitates tracking multiple optical targets using a single camera and without laser measurements necessary to determine distances from the camera. Aspects of the offshore crane system 198 facilitate quicker, more accurate, and less costly tracking of relative motion of optical targets relative to the camera. In one example, using positions of features within images to determine relative motion facilitates faster measurements, such as measurements taken in 30 milliseconds or less, than systems relying on lasers for distance measurements. In one example, using more than one optical target facilitates determining relative motion of an object within up to six degrees of freedom. In one embodiment, which can be combined with other embodiments, the first and second optical targets 111, 293 facilitate measuring rotational movement of the second vessel 104 and distinguishing the rotational movement from a lateral movement. In one example, the first and second optical targets 111, 293 facilitate measuring a yaw of the second vessel 104 about a vertical axis 287, and distinguishing the yaw from a lateral movement of the second vessel 104 along a horizontal axis.

In one example, using a single camera to track a plurality of optical targets facilitates more accurate and less costly tracking of relative motion as compared to systems using LiDAR sensors, MRU's, or a plurality of cameras.

Figure 2D:
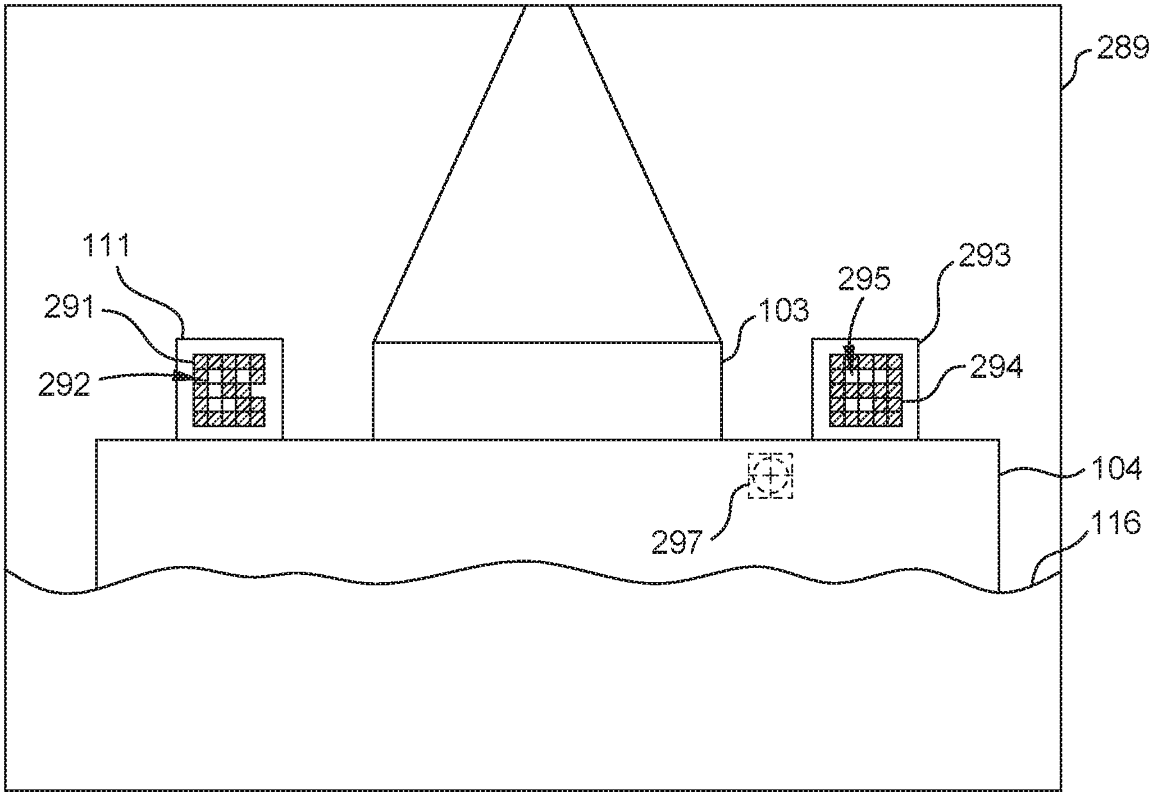
FIG. 2D is a schematic partial illustration of an image taken by the target tracking device illustrated in FIG. 1A of the optical target and the second optical target illustrated in FIG. 2C, according to an implementation of the disclosure.

FIG. 2D is a schematic partial illustration of an image 289 taken by the target tracking device 110 illustrated in FIG. 1A of the optical target 111 and the second optical target 293 illustrated in FIG. 2C, according to an implementation of the disclosure. In the image 289 of FIG. 2D, the second vessel 104 has moved (e.g., rolled or pitched) relative to the image 296 illustrated in FIG. 2C such that the reference point 297 is in a visually-obscured location such that the reference point 297 (shown in ghost in FIG. 2D) is not visible in the image 289 of FIG. 2D. The target tracking device 110 may still track the positioning and relative motion of the visually-obscured reference point 297 using the first and second optical targets 111, 293 within the image 289.

The present disclosure also contemplates that a visually-obscured reference point may be set in a visually-obscured location at known distances (such as a known distance along an X-axis and a known distance along a Y-axis) from the first optical target 111 and the second optical target 293. The target tracking device 110 facilitates tracking the visually-obscured reference point using the first and second optical target 111, 293 and the known distances even if the visually-obscured reference point is never within the field of view of the camera of the target tracking device 110 nor ever visible in any of the images taken by the camera of the target tracking device 110. The visually-obscured reference point may be visually-obscured such that it is not visible to an operator, such as an operator in the operator cab 105.

Figure 3A:
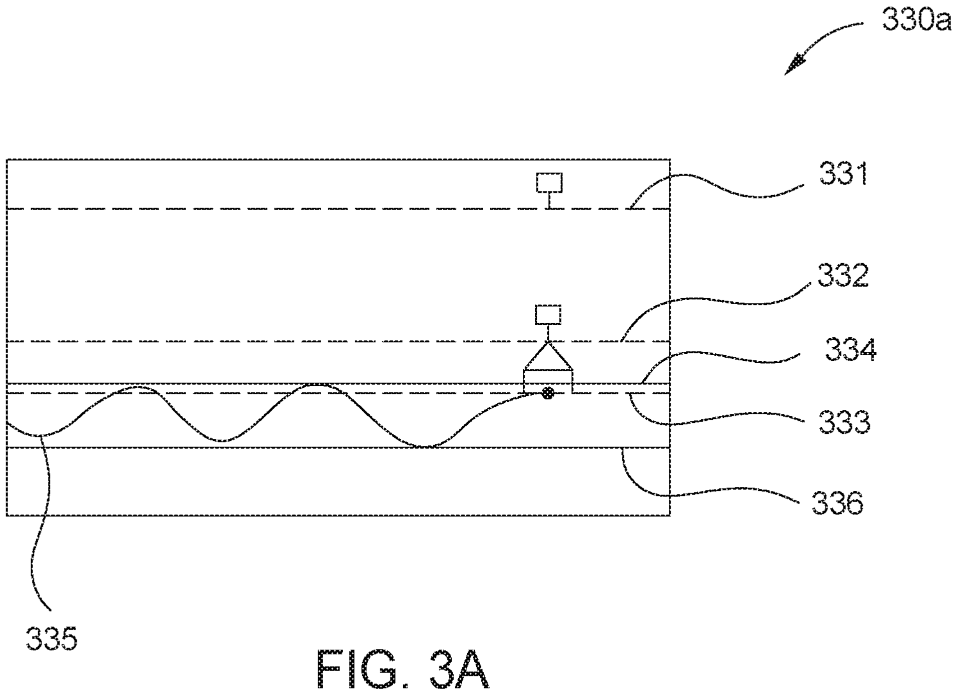
FIGS. 3A and 3B are schematic partial illustrations of data shown on a heads-up display (HUD), according to an implementation of the disclosure.
Figure 3B:
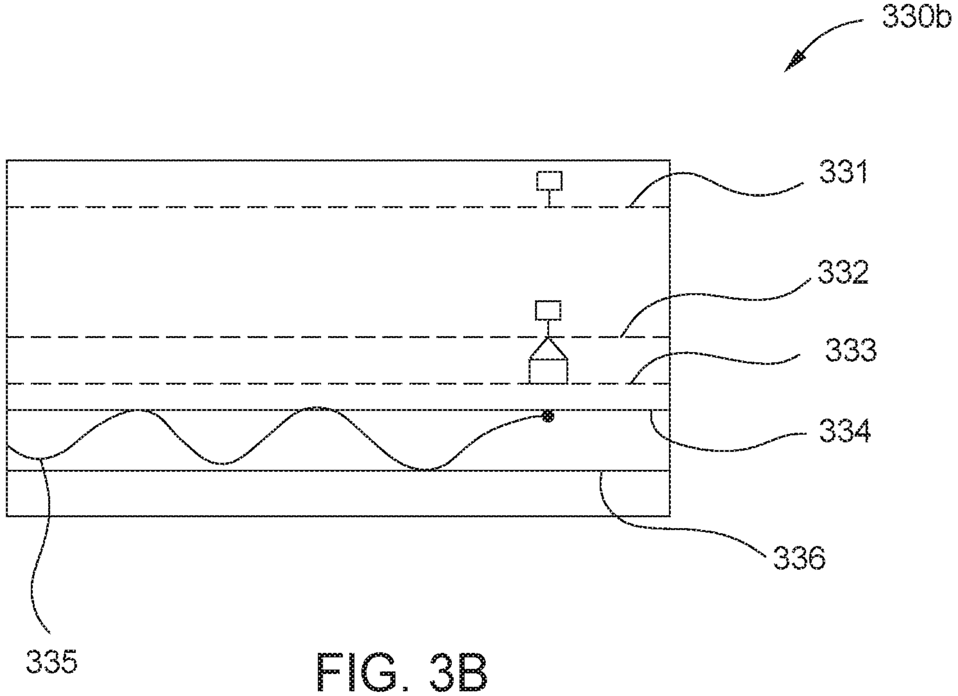

FIGS. 3A and 3B are schematic partial illustrations of data shown on heads-up displays (HUD), according to an implementation of the disclosure. FIG. 3A illustrates a HUD 330*a* during a lift-off operation, and FIG. 3B illustrates a HUD 330*b* during a landing operation.

In one example, data obtained by the target tracking device 110 is compiled and combined with other information from crane metrologies. In one example, the data obtained by the target tracking device 110 is compiled and combined with rope payout, boom angle, relative location of the carriage, and/or other data. The HUD is also configured to visually illustrate the ideal time to start a lifting or landing operation of the object 103 on the second vessel 104, or to direct operator control input, or to illustrate motion caused by the active heave compensator. The HUD may also display available hook height at a given location. The present disclosure contemplates that other data and/or views may be displayed on the HUD. For example, the HUD may display data variables within plots, text value readouts, three-dimensional model views, and/or video windows. A plurality of views may be displayed on the HUD simultaneously. A user, such as an operator, may toggle through a plurality of views on the HUD.

With reference to FIGS. 3A and 3B, the HUD 330*a* and the HUD 330*b* illustrate a hook stop position (e.g., maximum upward positon of the hook) at line 331, a current hook position at line 332, and a lower contact point of the object 103 (shown in FIG. 1A) at line 333. The relative location of the landing or lifting surface fluctuates due to relative motion between the vessels, as illustrated by oscillating line 335. The maximum upward detected motion of the landing or lifting surface is shown at line 334 and the maximum downward detected motion of the landing or lifting surface is shown at line 336. The relative distance between the lines 335, 336 over a given time interval is used by the system to determine relative velocity between the load and the landing or lifting surface. In one example, the lines 332-336 are updated real time on the HUDs 330*a* and 330*b*. The information provided on the HUDs 330*a* and 330*b* assists an operator in performing landing and lift-off operations while mitigating inadvertent contact between a vessel deck and an object being landed thereon or lifted therefrom. Additionally, an operator can more easily visualize the relative positions of a vessel deck and an object being landed thereon or lifted therefrom. In one example, the relative velocity between the load and the landing or lifting surface, or relative distance therebetween, is used by the system to determine the optimal time to lift or land the load to prevent damaging impacts related to the landing or the lifting of the load. The relative velocity or relative location may also be used to control constant tension or the active heave compensator 112 to prevent impact of the load. Therefore, it is possible to further expand the operational window in which operations may be performed versus conventional methods.

For example, using aspects described herein, the relative velocity of both vessels 102, 104 can be accurately derived, thereby mitigating excessive derating by eliminating inaccurate visual estimates of wave heights or relative motions used in conventional methods. Moreover, using aspects described herein, relative motions are updated on a real-time basis, further ensuring operational windows are not exceeded due to changing atmospheric conditions while still allowing operations to be performed at an upper boundary of an operational window.

Figure 4A:
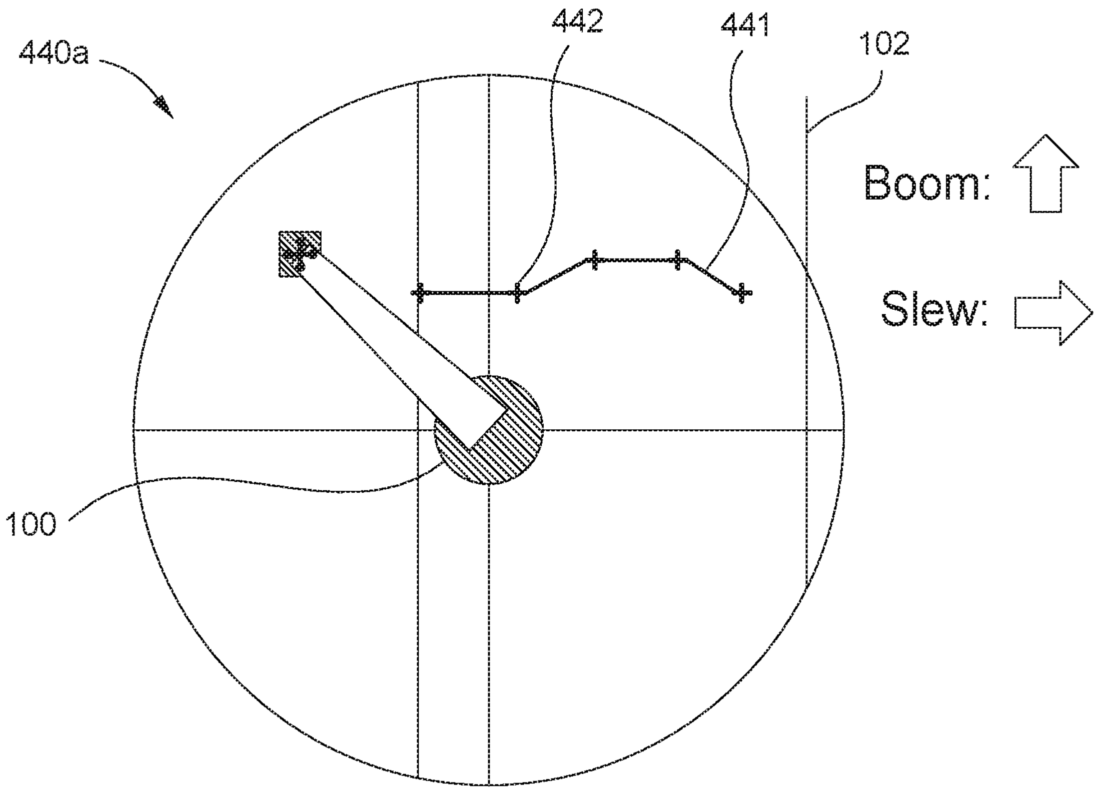
FIGS. 4A and 4B schematically and partially illustrate display information, according to implementations of the disclosure.
Figure 4B:
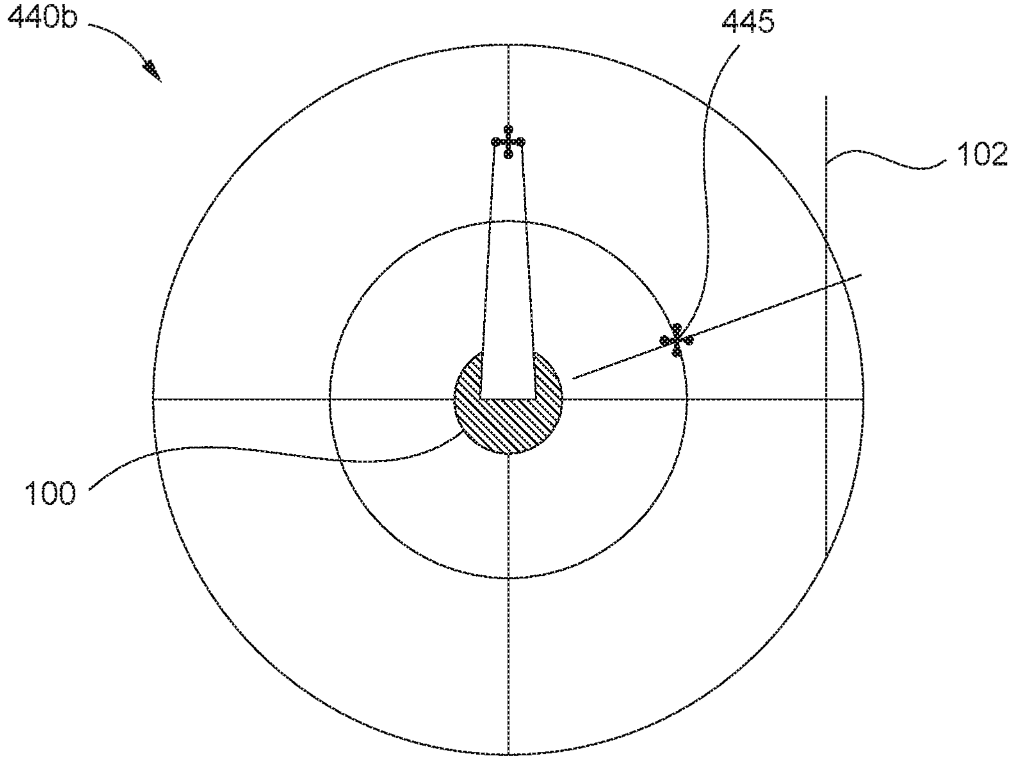

FIGS. 4A and 4B schematically and partially illustrate display information, according to implementations of the disclosure. As described above with respect to FIG. 1, a plurality of navigation points may be recognized and recorded by target tracking devices of the present disclosure. Such navigation points may be visible on a display visible to a crane operator. FIG. 4A is a representation of a display 440*a*. The display 440*a* schematically illustrates a top plan view of a crane 100 and the vessel 102. A travel path 441 is defined by a plurality of marked locations 442 (five are shown). Thus, a crane operator can easily visualize a desired path of a hook 109 (shown in FIG. 1B), and confirm that such a travel path 441 is being followed on the display 440*a*. It is contemplated that a controller may provide an operator with suggested boom and slew control to aid the operator in directing the hook 109 along the travel path 441. The travel path 441 may be selected to provide adequate clearance around objects, and thus, may allow a crane operator to navigate a hook into closer quarters than would be possible using conventional techniques.

FIG. 4B is a representation of a display 440*b*. The display 440*b* schematically illustrates a top plan view of a crane 100 and the vessel 102. The display 440*b* schematically illustrates a marked location 445 which indicates an objected to be lifted. The location 445 may be marked by an operator using a laser, or in another suitable manner. Additionally, the display 440*b* illustrates the radial distance from the crane 100 to the marked location 445, the lifting capacity of the crane at the radial distance, the lifting capacity of the crane 100 at the present location of the crane hook, and available hook height. It is contemplated that this and other information may be determined using aspects described herein, and displayed for operator usage on a display, such as display 440*b*. Thus, an operator can determine crane range and load accurately at any given location, without need to move the boom/hook of the crane 100.

Figure 5:
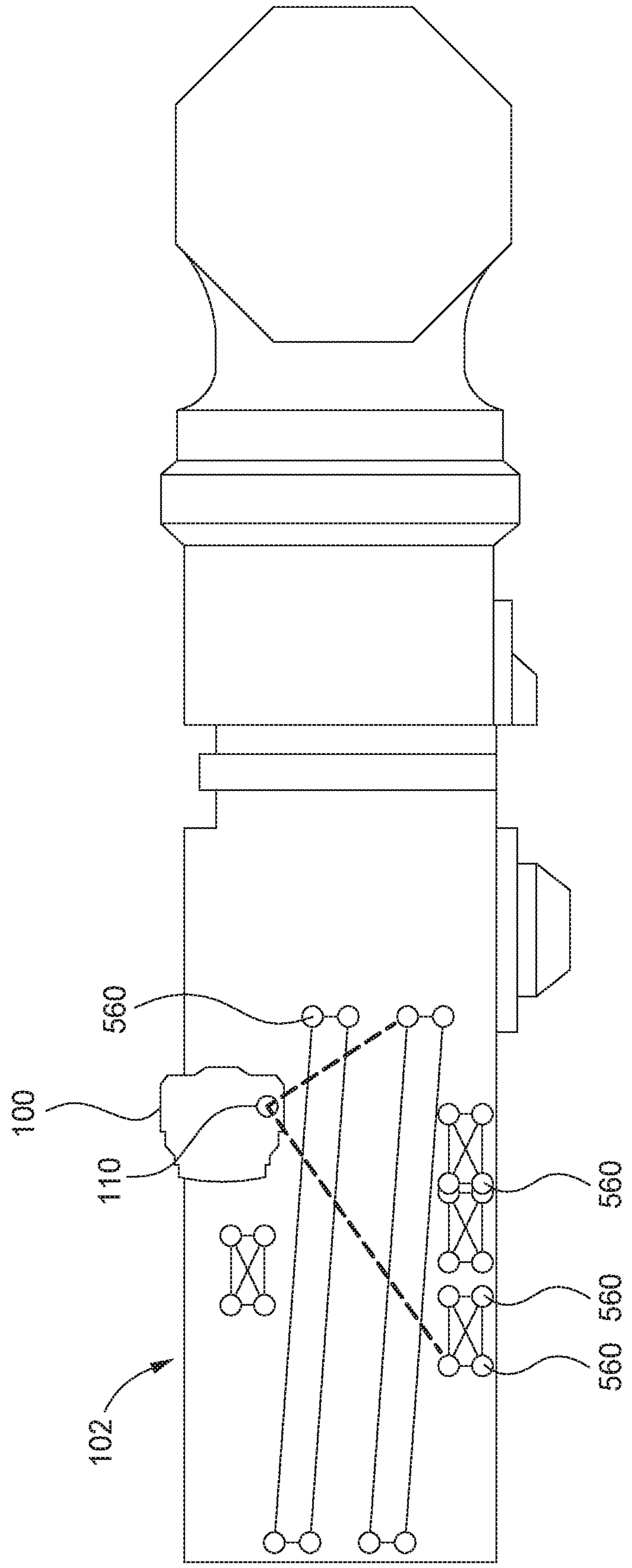
FIG. 5 is a schematic partial top plan view of a vessel having a crane thereon.

FIG. 5 is a schematic partial top plan view of a vessel 102 having a crane 100 thereon. Using aspects described herein, a target tracking device 110 (shown in FIG. 1B) is capable of facilitating determination of a distance between the crane 100 and one or more designated locations 560 on the deck 101 of the vessel 102. It is to be noted that the illustrated locations 560 are examples, and many other locations 560 are amenable to distance determination using the target tracking device 110. The locations 560 are, for example, locations to land a load or locations where a load will be lifted from. A controller, such as controller 115, can recognize these locations prior to lifting or landing a load to predetermine the operation window for a particular lift. In one example, the controller may predetermine locations to land a load prior to transferring the load to the deck of the vessel 102. The controller can, for example, optimize the utilization of space on the deck for a given set of loads. Still further, an operator can indicate the locations 560 prior to landing a load therebetween. The indicated locations 560 can then be used to determine any necessary deck modifications to secure the load(s) thereto thereby saving modification time and costs. Still further, the locations may be safety barricaded to prevent entry thereto by personnel during the load lift thereby greatly improving safety.

In one example, the target tracking device 110 is coupled to a laser indicator. The target tracking device 110 may irradiate a position, such as a landing location of a load, with the laser indicator for personnel to mark the position, such as locations 560. The locations 560 may be determined by the system as described above or coordinate points input into the system by an operator. Indicating such positions decreases the time necessary for personnel to manually measure locations using conventional means, such as, to determine the landing location of a load.

In addition, as described above, when ascertaining a distance from the crane 100 to a location 560, a display, such as the HUD 440*b* shown in FIG. 4B, provides to a crane operator a maximum crane lifting capacity and maximum hook height at the location 560. To facilitate display of the maximum crane lifting capacity and hook height at the location 560, an index or table stored in a memory containing such information may be referenced.

Figure 6A:
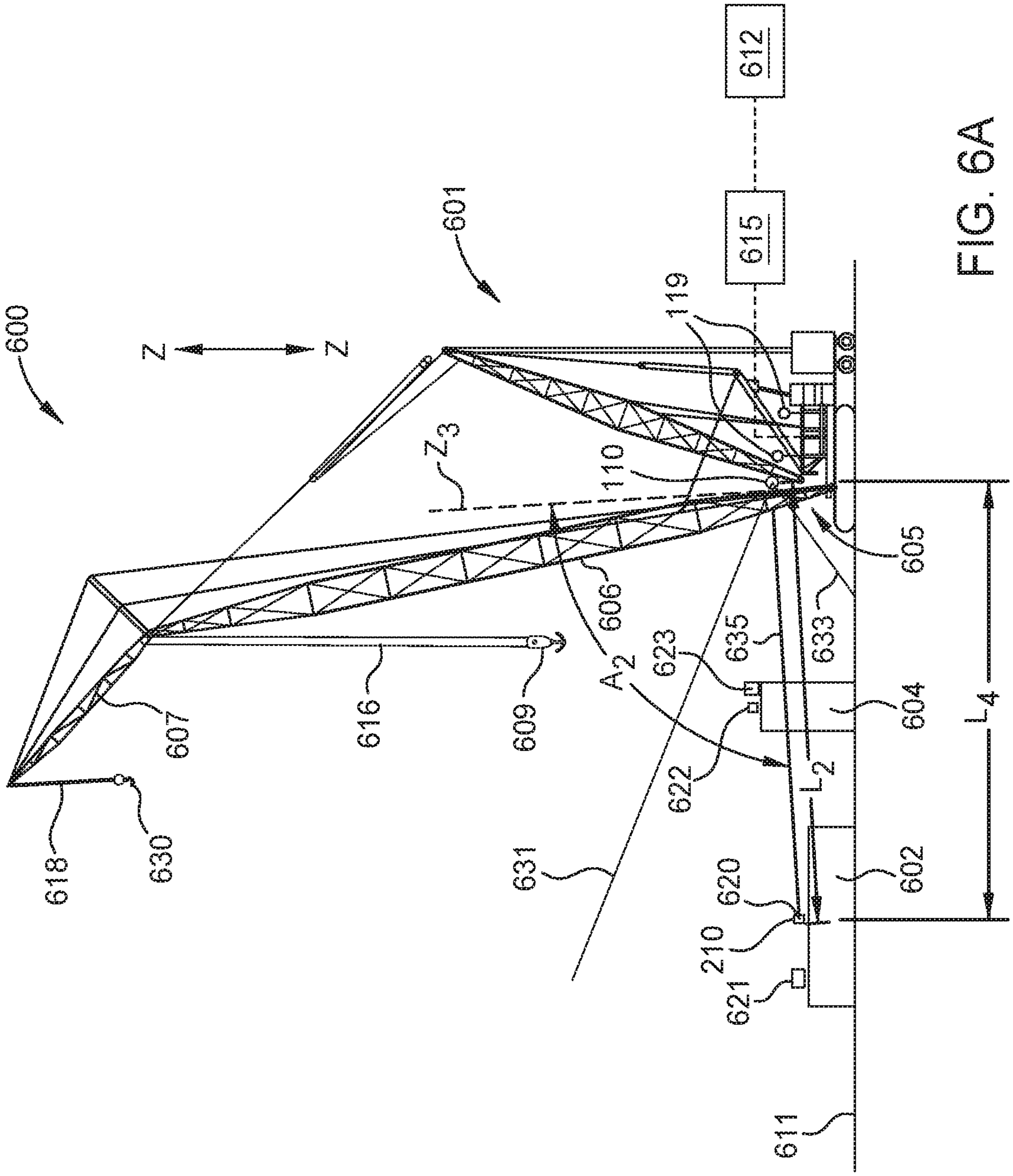
FIG. 6A illustrates a schematic partial view of an onshore crane system, according to an implementation of the disclosure.

FIG. 6A illustrates a schematic partial view of an onshore crane system 600, according to an implementation of the disclosure. The onshore crane system 600 includes an onshore crane 601, a first object 602, and a second object 604. The first object 602 and the second object 604 may include cargo, or other items. The onshore crane 601 is disposed on an onshore surface 611 and is configured to be fixed on or movable on the onshore surface 611. The onshore surface 611 may be on a wharf, a loading dock, an unloading dock, on land, or on an onshore structure thereof. The onshore crane 601 includes a boom 606, a jib 607 a first hoist line 616, and a second hoist line 618. The onshore crane 601 also includes an operator cab 605, a first hook 609, and a second hook 630. The onshore crane 601 may include one or more aspects or components of the crane 100 described above.

The onshore crane system 600 includes a target tracking device 110 mounted on or adjacent to the operator cab 605 of the onshore crane 601. The target tracking device 110 can include one or more of the features, aspects, or components described above for the target tracking device 110. In one example, the target tracking device 110 includes a laser generator and is configured to direct a laser beam towards one or more optical targets. In one example, the target tracking device 110 includes a camera and is configured to capture a video image and/or a photographic image of one or more optical targets. The onshore crane system 600 also includes a controller 615. The controller 615 is similar to the controller 115 described above, and can include one or more of the features, aspects, and components thereof. A first optical target 620 is disposed on or in the first object 602 and a second optical target 622 is disposed on or in the second object 604. The first and second optical targets 620, 622 are similar to the optical target 111 described above, and may include one or more features, aspects, and components thereof. In one example, one or both of the first optical target 620 and the second optical target 622 include a tag.

The target tracking device 110 is configured to scan between a first angular position 631 and a second angular position 633 to recognize, locate, and track one or both of the first optical target 620 and/or the second optical target 622. The target tracking device 110 scans between the first angular position 631 and the second angular position 633 to position one or both of the first optical target 620 and/or the second optical target 622 within the field of view of the target tracking device 110. The first angular position 631 and the second angular position 633 are disposed in a vertical plane. The first angular position 631 and second angular position 633 can be preselected, such as by an operator, For example, an operator can define an angular range between the first angular position 631 and the second angular position 633. Examples of angular ranges may include 360 degrees, 270 degrees, 180 degrees, 90 degrees, or other angular ranges. The target tracking device 110 is configured to facilitate determining the vertical positions and/or relative vertical distances of the first optical target 620 of the first object 602 and the second optical target 622 of the second object 604. As an example, target tracking device 110 is configured to facilitate determining the vertical positions and/or relative vertical distances in a vertical direction Z-Z. The relative vertical distances of the optical targets 620, 622 can be relative to a vertical position of the target tracking device 110 or any other location or component of the onshore crane system 600, such as the onshore surface 611. The target tracking device 110 is also configured to facilitate determining an angle $A_2$ of a line of sight 635 between the target tracking device 110 and the first optical target 620 of the first object 602. The angle $A_2$ is relative to a vertical axis $Z_3$ of the onshore crane 601. The angle $A_2$ could be relative to another reference axis. The target tracking device 110 can also facilitate determining an angle of a line of sight between the target tracking device 110 and the second optical target 622 of the second object 604, relative to the vertical axis $Z_3$ of the onshore crane 601 or another reference axis. The target tracking device 110 is further configured to facilitate determining a direct distance $L_2$ and a horizontal distance $L_4$ between the target tracking device 110 and the first optical target 620.

The onshore crane system 600 includes an RFD reader 612 that is in communication with the controller 615 and/or the target tracking device 110. The first optical target 620 includes an RFD tag 210. The RFID tag 210 may include one or more of the aspects, features, and/or components described above in reference to FIG. 2B. The RFID tag 210 is configured to transmit information relating to the first object 602. The information may include but is not limited to an as-built weight, dimension(s), rigging certification information, vertical position(s), horizontal position(s), vertical offset(s) from the RFID tag 210, and/or horizontal offset(s) from the RFID tag 210. The RFID tag 210 is configured to facilitate the target tracking device 110 locating the first object 602 if the first object 602 were to be located outside a field of view of the target tracking device 110. For example, the RFID tag 210 is configured to facilitate the target tracking device 110 scanning for and locating the first optical target 620 of the first object 602. In one example, the first object 602 is outside of the first angular position 631 and the second angular position 633 of the target tracking device 110. The RFID tag 210 facilitates adjusting the target tracking device 110 to scan for and locate the first object 602 that is outside of the first angular position 631 and the second angular position 633. In one example, the controller 615 facilitates adjusting the first angular position 631 and the second angular position 633 of the target tracking device 110 to encompass the first optical target 620.

The RFID reader 612 is configured to detect the RFID tag 210 and receive information from the RFID tag 210. The RFID reader 612 is configured to transmit information to the controller 615. The controller 615 facilitates adjusting a field of view of the target tracking device 110 to scan for and locate the first optical target 620. In one example, the information includes one or more of a vertical position of the first object 602, a horizontal position of the first object 602, an as-built weight of the first object 602, dimension(s) of the first object 602, rigging certification information of the first object 602, and/or position offsets between the RFID tag 210 and the first object 602.

Figure 6B:
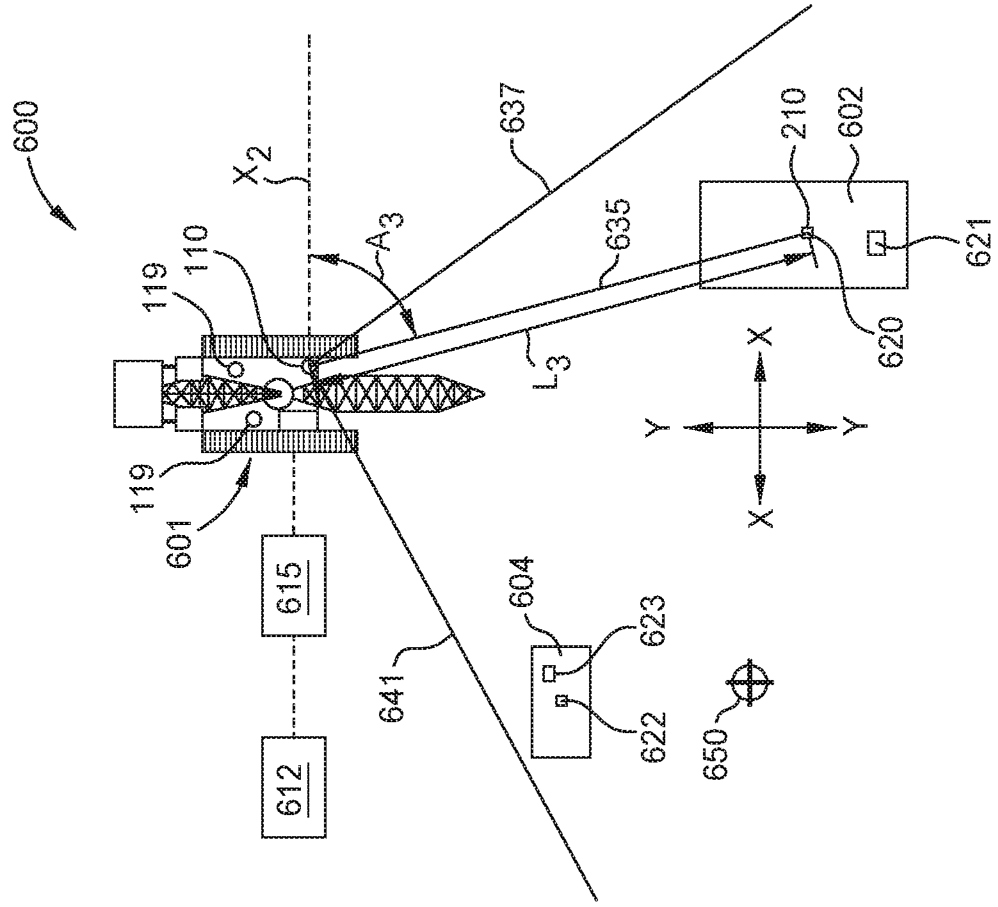
FIG. 6B illustrates a schematic partial top view of the onshore crane system illustrated in FIG. 6A, according to an implementation of the disclosure.

FIG. 6B illustrates a schematic partial top view of the onshore crane system 600 illustrated in FIG. 6A, according to an implementation of the disclosure. The target tracking device 110 is configured to scan between a first angular position 637 and a second angular position 641 to recognize, locate, and track one or both of the first optical target 620 and/or the second optical target 622. Although angular positions are illustrated in FIG. 6B for the first angular position 637 and the second angular position 641, other angular positions are contemplated by the present disclosure. The first angular position 637 and the second angular position 641 are disposed in a horizontal plane. The first angular position 637 and the second angular position 641 can be preselected, such as by an operator. For example, an operator can define an angular range between the first angular position 637 and the second angular position 641. Examples of angular ranges may include 360 degrees, 270 degrees, 180 degrees, 90 degrees, or other angular ranges. The target tracking device 110 is configured to facilitate determining the horizontal positions and/or relative horizontal positions of the first optical target 620 of the first object 602 and the second optical target 622 of the second object 604. As an example, target tracking device 110 is configured to facilitate determining first horizontal positions and/or first horizontal distances relative to the target tracking device 110 of the first optical target 620 and/or the second optical target 622 in a first horizontal direction X-X. The target tracking device 110 is also configured to facilitate determining second horizontal positions and/or second horizontal distances relative to the target tracking device 110 of the first optical target 620 and/or the second optical target 622 in a second horizontal direction Y-Y. The first relative horizontal distances and second relative horizontal distances of optical targets 620, 622 can be relative to a first horizontal position and a second horizontal position of the target tracking device 110.

The target tracking device 110 is also configured to facilitate determining an angle $A_3$ of the line of sight 635 between the target tracking device 110 and the first optical target 620 of the first object 602. The angle $A_3$ is relative to a horizontal axis $X_2$ of the onshore crane 601. The angle $A_3$ could be relative to another reference axis. The target tracking device 110 can also facilitate determining an angle of a line of sight between the target tracking device 110 and the second optical target 622 of the second object 604, relative to the horizontal axis $X_2$ of the onshore crane 601 or another reference axis. The target tracking device 110 is further configured to facilitate determining a direct distance $L_3$ between the target tracking device 110 and the first optical target 620.

The controller 615 is configured to receive data from the target tracking device 110, such as one or more of the vertical positions, relative vertical positions, relative vertical distances, first horizontal positions, first horizontal distances relative to the target tracking device 110, second horizontal positions, second horizontal distances relative to the target tracking device 110, direct distance $L_2$, direct distance $L_3$, horizontal distance $L_4$, angle $A_2$, and/or angle $A_3$. Using data from the target tracking device 110, the controller is configured to determine operational parameters for the onshore crane 601. The controller 615 is configured to determine one or more of loading capacity, vertical hook height, horizontal hook positioning, and/or lift radius for the onshore crane 601 at the locations of the first optical target 620 and the second optical target 622. The controller 615 is also configured to determine a slew angle and a reach radius for the first optical target 620 and/or the second optical target 622. The controller 615 is also configured to determine such operational parameters for the locations of a first offset 621 that is offset from the first optical target 620 and a second offset 623 that is offset from the second optical target 622.

By determining parameters such as vertical positions, horizontal positions, direct distance $L_2$, direct distance $L_3$, horizontal distance $L_4$, angle $A_2$, and/or horizontal angle $A_3$, the working load of lifting and moving an object can be determined without having to first move a crane into a lifting configuration. An operator can also accurately place one or more hooks of a crane at one or more optical targets (or offsets therefrom) to efficiently lift one or more objects. This saves time by reducing or eliminating the need for trial and error placement of the hooks.

The controller 615 is configured to control operation of the onshore crane 601. As an example, the controller 615 is configured to control the positions, movement, and/or load capacities of components of the onshore crane 601. The controller 615 can thus automate the operation of the onshore crane 601. As an example, the controller 615 is configured to send instructions to the onshore crane 601 that guide one or both of the first hook 609 and/or the second hook 630 towards one or more of the first optical target 620, the second optical target 622, the first offset 621, and/or the second offset 623. The controller 615 can also send instructions that cause the onshore crane 601 to lift one or more of the first object 602 and/or the second object 604 within lifting capacities of the onshore crane 601.

By using a controller to control the positions, movement, and/or load capacities of crane components, operations are efficiently and accurately performed by reducing or eliminating human error and automating the operation of the crane.

The onshore crane system 600 is capable of tracking positions and/or distances of the first optical target 620 and/or the second optical target 622 in the first horizontal direction X-X, the second horizontal direction Y-Y, and the vertical direction Z-Z. This allows the onshore crane system 600 to track locations or movement of the first object 602 and/or the second object 604 in at least three dimensions (or at least three degrees of freedom).

In embodiments where a camera is included as part of the target tracking device 110, the onshore crane system 600 is capable of tracking up to six degrees of freedom for the first object 602 and/or the second object 604. For example, the photographic image or video image generated by the camera allows tracking the surge, heave, sway, roll, pitch, and/or yaw of the first object 602 and/or the second object 604.

As an example, target tracking device 110 is configured to facilitate determining first horizontal positions and/or first relative horizontal distances of the first optical target 620 and/or the second optical target 622 in a first horizontal direction X-X. The target tracking device 110 is also configured to facilitate determining second horizontal positions and/or second relative horizontal distances of the first optical target 620 and/or the second optical target 622 in a second horizontal direction Y-Y.

An operator may set a landing location 650 for one or more of the first object 603 and/or the second object 604. The target tracking device 110 facilitates determining a vertical position, a first horizontal position, and/or a second horizontal position of the landing location 650 relative to the target tracking device 110 prior to the first and second hooks 609, 630 picking up the first object 602 and/or the second object 604. The target tracking device 110 facilitates determining the parameters under which the onshore crane 601 should pick up and move the first object 602 and/or the second object 604 to the landing location 650. Aspects of the onshore crane system 600, such as target tracking device 110, facilitates operational efficiency and operational accuracy as the onshore crane system 600 is configured to move multiple objects sequentially or simultaneously, and the onshore crane system 600 can guide the hooks 609, 630 to the objects to lift the objects, move the objects, and land the objects. The onshore crane system 600, using the target tracking device 110, can also determine prior to beginning to move the hooks 609, 630 toward the objects: (1) whether it is possible to move multiple objects (such as the first and second objects 602, 604)—either simultaneously or sequentially—to one or more landing locations (such as the landing location 650); and (2) under what parameters the objects should be lifted, moved, and landed on the one or more landing locations.

As the onshore crane 601 lifts the first object 602 and/or second object 604, the controller 615 can control the onshore crane 601 using operational parameters such as lift radius, hook height, lifting capacity, slew angle, reach radius, and target location(s) for the first object 602 and/or second object 604.

Figure 7A:
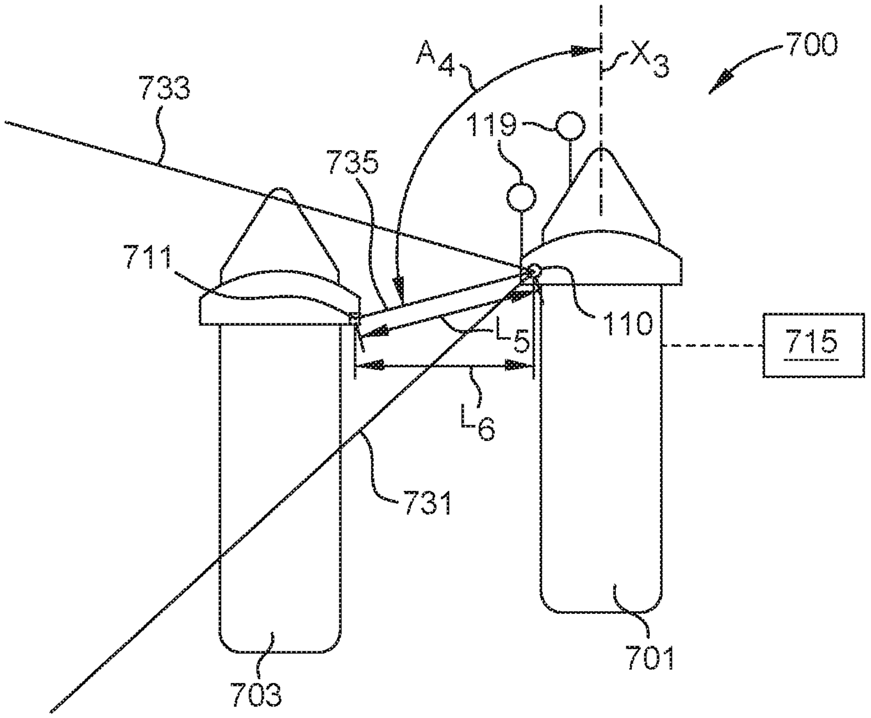
FIG. 7A is a schematic partial illustration of a ship system in a first position, according to an implementation of the disclosure.

FIG. 7A is a schematic partial illustration of a ship system 700, according to an implementation of the disclosure. Ship system 700 includes a vessel 701 and an object 703. The object 703 can be, for example, another vessel, a docking structure on a shore, or an offshore platform. The vessel 701 includes a target tracking device 710. The target tracking device 110 can include one or more of the features, aspects, or components described above for the target tracking device 110.

The object 703 includes an optical target 711 disposed thereon. The optical target 711 is similar to one or more of the optical target 111, first optical target 620, and second optical target 622, and may include one or more aspects, features, and components thereof.

The target tracking device 110 is configured to scan between a first angular position 731 and a second angular position 733 to recognize, locate, and track the optical target 711. The first angular position 731 and second angular position 733 can be preselected, such as by an operator. For example, an operator can define an angular range between the first angular position 731 and the second angular position 733. Examples of angular ranges may include 360 degrees, 270 degrees, 180 degrees, 90 degrees, or other angular ranges. The target tracking device 110 is configured to facilitate determining the vertical positions and/or relative vertical positions of the optical target 711. The relative vertical positions of the optical target 711 can be relative to a vertical position of the target tracking device 110 or any other location or component of the ship system 700. The target tracking device is also configured to facilitate determining first horizontal positions and/or first relative horizontal positions of the optical target 711. The target tracking device 110 is further configured to facilitate determining second horizontal positions and/or second relative horizontal positions of the optical target 711. The first relative horizontal positions and the second relative horizontal positions of the optical target 711 can be relative to a first horizontal position and a second horizontal position of the target tracking device 110 or any other location or component of the ship system 700.

The target tracking device 110 is configured to facilitate determining an angle $A_4$ of a line of sight 735 between the target tracking device 110 and the optical target 711. The angle $A_4$ is relative to a horizontal axis $X_3$ of the vessel 701. The angle $A_4$ could be relative to another reference axis. The target tracking device 110 is further configured to facilitate determination of a direct distance $L_5$ and a horizontal distance $L_6$ between the target tracking device 110 and the optical target 711.

The ship system 700 also includes a controller 715 coupled to the vessel 701. The controller 715 can be part of the ship position control system of the vessel 701. The controller 715 is similar to controller 115 and controller 615 described above, and can include one or more of the features, aspects, and components thereof. The controller 715 is configured to control the movements of the vessel 701. The controller 715 is also configured to receive data from the target tracking device 110, and to facilitate determinations of measurements in conjunction with the target tracking device 110. The data includes one or more of positions of the optical target 711 within one or more images taken by the camera of the target tracking device 110, vertical positions of the optical target 711, relative vertical positions of the optical target 711, first horizontal positions of the optical target 711, first relative horizontal positions of the optical target 711, second horizontal positions of the optical target 711, second relative horizontal positions of the optical target 711, angle $A_4$, direct distance $L_5$, and/or horizontal distance $L_6$. The controller 715 determines a relative vertical motion, a first relative horizontal motion, and a second horizontal relative motion of the optical target 711 using the data received from the target tracking device 110. The relative vertical motion, first relative horizontal motion, and second horizontal relative motion of the optical target 711 can be relative to a vertical motion, first horizontal motion, and second horizontal motion of the target tracking device 110 or any other location or component of the ship system 700.

The controller 715 is configured to control the position, direction, and/or speed of the vessel 701 using data received from the target tracking device 110. The controller 715 can use the data to maintain the vessel 701 at a specified offset distance and/or a specified offset angle from the optical target 711 of the object 703. The controller 715 can also use the data to move the vessel 701 toward the optical target 711 and/or dock the vessel 701 to the object 703. As an example, the controller 715 can use the data received from the target tracking device 110 to maintain the target tracking device 110 at a specified location relative to the optical target 711. The controller 715 facilitates positioning of the vessel 701 relative to the object 703 based on data obtained from the target tracking device 110.

Figure 7B:
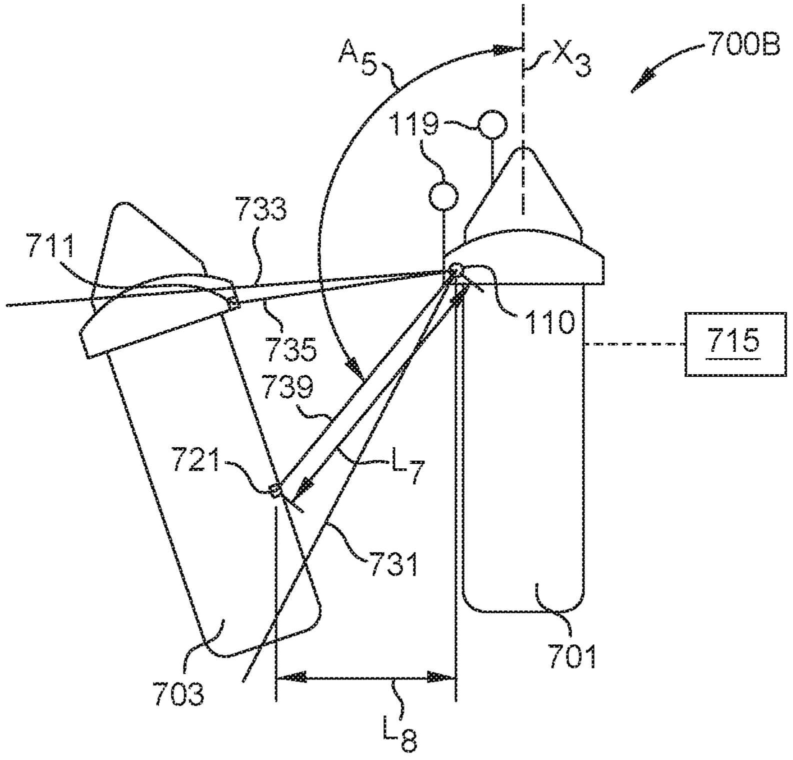
FIG. 7B is a schematic partial illustration of a ship system in a second position, according to an implementation of the disclosure.

FIG. 7B is a schematic partial illustration of a ship system 700B, according to an implementation of the disclosure. The ship system 700B illustrated in FIG. 7B is similar to the ship system 700 illustrated in FIG. 7A, and includes a second optical target 721 disposed on or in the object 703. FIG. 7A depicts a ship system 700 in a first position, and FIG. 4B depicts a ship system 700B in a second position. The second optical target 721 is similar to one or more of the optical target 111, first optical target 620, and optical target 711, and may include one or more of the features, components, and aspects thereof.

The target tracking device 110 is configured to scan between the first angular position 731 and the second angular position 733 to recognize, locate, and track the second optical target 721. The first angular position 731 and second angular position 733 can be preselected, such as by an operator. For example, an operator can define an angular range between the first angular position 731 and the second angular position 733. Examples of angular ranges may include 360 degrees, 270 degrees, 180 degrees, 90 degrees, or other angular ranges. The target tracking device 110 is configured to facilitate determination of the vertical positions and/or relative vertical positions of the second optical target 721. The relative vertical positions of the second optical target 721 can be relative to a vertical position of the target tracking device 110 or any other location or component of the ship system 700B. The target tracking device 110 is also configured to facilitate determining first horizontal positions and/or first relative horizontal positions of the second optical target 721. The target tracking device 110 is further configured to facilitate determining second horizontal positions and/or second relative horizontal positions of the second optical target 721. The first relative horizontal positions and the second relative horizontal positions of the second optical target 721 can be relative to a first horizontal position and a second horizontal position of the target tracking device 110 or any other location or component of the ship system 700B. With this data, calculations may be run to determine a relative location of the second optical target 721 to the target tracking device 110. This allows a determination of a specific location of the object 703 relative to the vessel 701, and/or a specific orientation of the object 703 relative to the vessel 701.

The target tracking device 110 is configured to facilitate determining an angle $A_5$ of a line of sight 739 between the target tracking device 110 and the second optical target 721. The angle $A_5$ is relative to a horizontal axis $X_3$ of the vessel 701. The angle $A_5$ could be relative to another reference axis. The target tracking device 110 is further configured to facilitate determining a direct distance $L_7$ and a horizontal distance $L_8$ between the target tracking device 110 and the second optical target 721.

The data that the controller 715 receives from the target tracking device 110 can include one or more of angle $A_5$, direct distance $L_7$, horizontal distance $L_8$, the vertical positions of the second optical target 721, the relative vertical positions of the second optical target 721, the first horizontal positions of the second optical target 721, the first relative horizontal positions of the second optical target 721, the second horizontal positions of the second optical target 721, and/or the second relative horizontal positions of the second optical target 721. The controller 715 determines a relative vertical motion, a first relative horizontal motion, and a second horizontal relative motion of the second optical target 721 using the data received from the target tracking device 110. The relative vertical motion, first relative horizontal motion, and second horizontal relative motion of the second optical target 721 can be relative to a vertical motion, first horizontal motion, and second horizontal motion of the target tracking device 110 or any other location or component of the ship system 700B.

The controller 715 is configured to compare the data received for the second optical target 721 to the data received for the optical target 711. For example, the controller 715 can compare the angle $A_5$ for the second optical target 721 to the angle $A_4$ for the optical target 711. The controller 715 can use such comparisons to control the position, direction, or speed of the vessel 701.

Figure 7C:
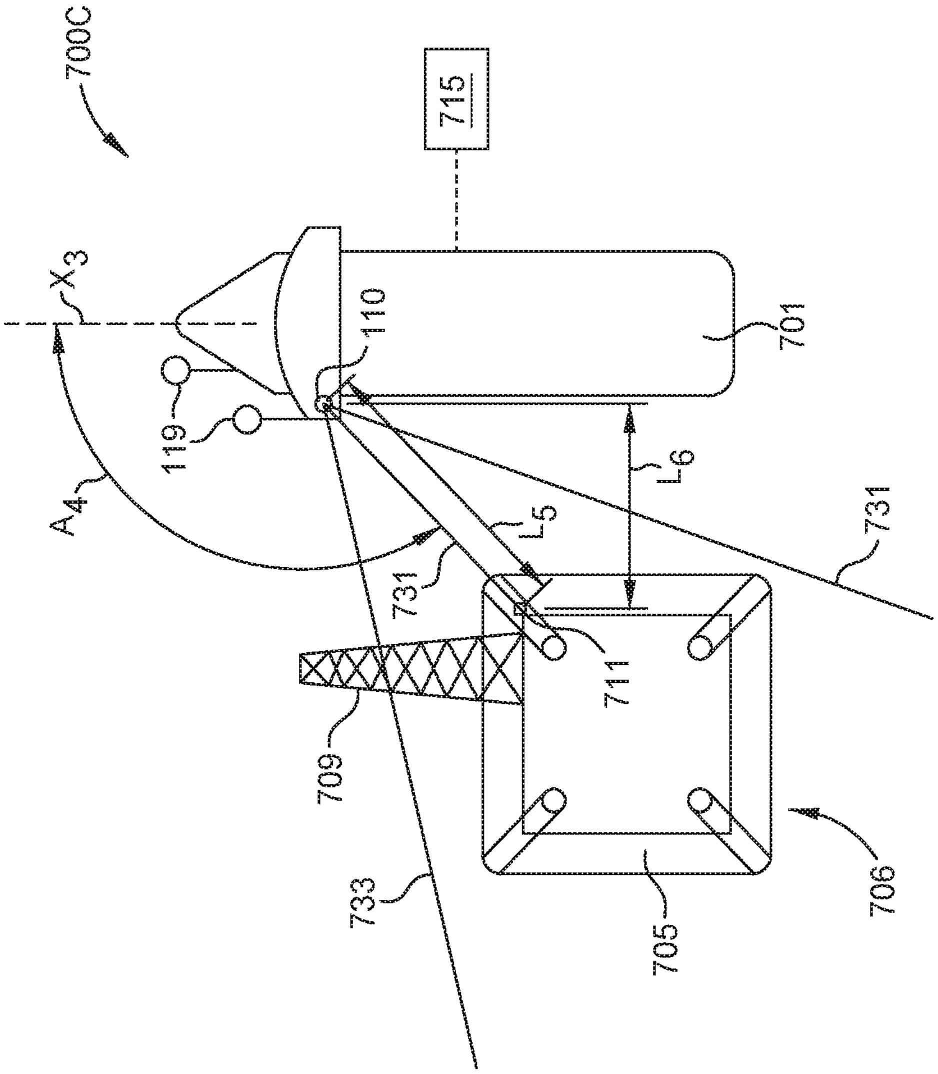
FIG. 7C is a schematic partial illustration of a ship system, according to an implementation of the disclosure.

FIG. 7C is a schematic partial illustration of a ship system 700C, according to an implementation of the disclosure. An object 706 is an offshore platform 705. The offshore platform 705 can be fixed or floating. In one example, the offshore platform 705 includes oil and gas equipment, such as a derrick 709. However, the derrick 709 is only one example of equipment which may be included. It is contemplated that the object 706 may additionally or alternatively include other equipment thereon.

The controller 715 is configured to facilitate positioning the vessel 701 at, or move the vessel 701 to, a location relative to the offshore platform 705. As an example, the controller 715 is configured to facilitate positioning the target tracking device 110 at, or moving the target tracking device 110 to, a location relative to the optical target 711 disposed on the offshore platform 705 via movement of the vessel 701. In one example, the controller 715 is configured to facilitating docking of the vessel 701 to the offshore platform 705. In some examples, the controller 715 may position the vessel 701 by use of an autopilot function.

By tracking the position and/or movement of at least one optical target, the ship system 700C is able to account for effects of the ocean on an object 706, such as the heave of object 706 in response to ocean waves. The ship system 700C also assists or automates the docking of a ship, or the positioning of a ship relative to an object.

The ship system 700C is capable of tracking positions of the optical target 711 and/or the second optical target 721 in a first horizontal direction, a second horizontal direction, and a vertical direction. This allows the ship system 700C to track locations or movements of the object 706 in at least three dimensions (or at least three degrees of freedom). Unlike other configurations, the ship system is not limited to tracking positions of objects in less than three dimensions, such as in two degrees of freedom.

In implementations where two or more optical targets are used (such as in ship system 700B), the ship system 700B can track up to six degrees of freedom for the object 703. For example, the ship system 700B can track the surge, heave, sway, roll, pitch, and/or yaw of the object 703. Using two or more optical targets also allows for accurate measurements of the location of object 703 by providing data points for comparison between the two or more optical targets.

In implementations where the target tracking device 110 includes a camera, the ship system 700C is capable of tracking up to six degrees of freedom. The camera also provides a visual image of the object 706.

The ship system 700C reduces operational risks, such as the risk of collision, by tracking the object 706. The tracking features of the ship system 700C also reduce time consumed by other maneuvering configurations.

Figure 8A:
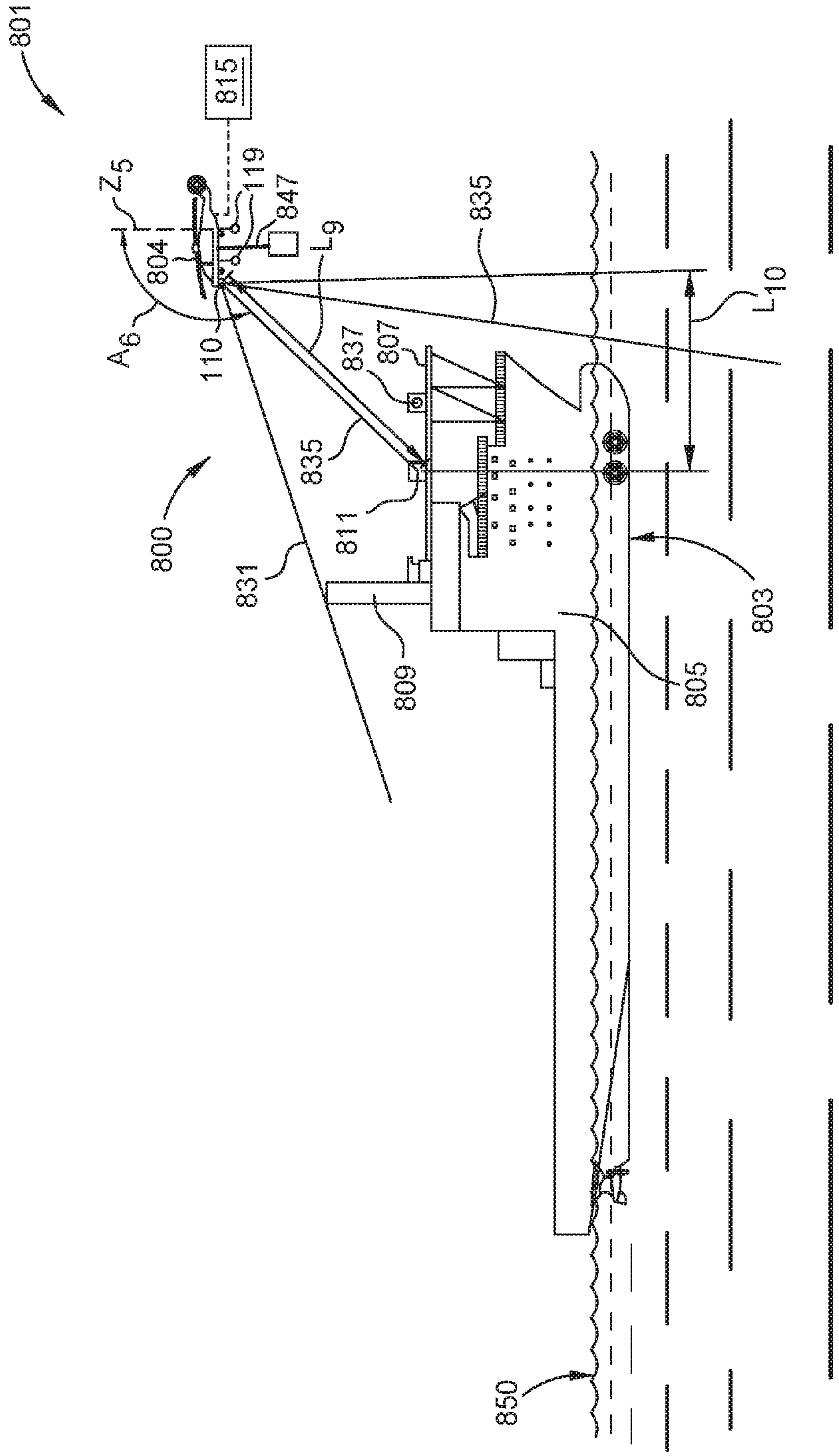
FIG. 8A is a schematic partial illustration of an aviation system, according to an implementation of the disclosure.

FIG. 8A is a schematic partial illustration of an aviation system 800, according to an implementation of the disclosure. The aviation system 800 includes an aircraft 801 and an object 803. In the implementation illustrated, the aircraft 801 is a helicopter 804 and the object 803 is a vessel 805. The aviation system 800 also includes a controller 815. The controller 815 is similar to controller 115, controller 615, and controller 715 described above, and can include one or more of the features, aspects, and components thereof.

The vessel 805 includes a platform 807 disposed thereon. An optical target 811 is disposed on the platform 807. The optical target 811 is similar to optical target 111, first optical target 620, second optical target 622, optical target 711, and second optical target 721, and may include one or more aspects, features, and components thereof.

The vessel 805 may also include equipment 809 thereon, such as oil and gas production equipment. The helicopter 804 includes a target tracking device 110 disposed on the bottom side of the helicopter 804. The target tracking device 110 is similar to the target tracking device 110 discussed above, and may include one or more of the features, components, and aspects thereof.

The target tracking device 110 is configured to scan between a first angular position 831 and a second angular position 833 to recognize, locate, and track the optical target 811. The first angular position 831 and second angular position 833 can be preselected, such as by an operator. For example, an operator can define an angular range between the first angular position 831 and the second angular position 833. Examples of angular ranges may include 360 degrees, 270 degrees, 180 degrees, 90 degrees, or other angular ranges. The target tracking device 110 is configured to facilitate determining the vertical positions and/or relative vertical positions of the optical target 811 in a vertical direction. The relative vertical positions of the optical target 811 can be relative to a vertical position of the target tracking device 110 or any other location or component of the aviation system 800.

The target tracking device is also configured to facilitate determining first horizontal positions and/or first relative horizontal positions of the optical target 811. The target tracking device 110 is further configured to facilitate determining second horizontal positions and/or second relative horizontal positions of the optical target 811. The first relative horizontal positions and the second relative horizontal positions of the optical target 811 can be relative to a first horizontal position and a second horizontal position of the target tracking device 110 or any other location or component of the aviation system 800.

The target tracking device 110 is configured to facilitate determining an angle $A_6$ of a line of sight 835 between the target tracking device 110 and the optical target 811. The angle $A_6$ is relative to a vertical axis $Z_5$ of the helicopter 804. The angle $A_6$ could be relative to another reference axis. The target tracking device 110 is further configured to facilitate determining a direct distance $L_9$ and a horizontal distance $L_{10}$ between the target tracking device 110 and the optical target 811.

The controller 815 is configured to control the movements of the aircraft 801. The controller 815 may be part of the flight control system of the aircraft 801. The controller 815 receives data from the target tracking device 110. The data includes one or more of positions of the optical target 811 within one or more images taken by the camera of the target tracking device 110, the vertical positions of the optical target 811 relative vertical positions of the optical target 811, first horizontal positions of the optical target 811, first relative horizontal positions of the optical target 811, second horizontal positions of the optical target 811, second relative horizontal positions of the optical target 811, angle $A_6$, direct distance $L_9$, and/or horizontal distance $L_{10}$. The controller 815 determines a relative vertical motion, a first relative horizontal motion, and a second horizontal relative motion of the optical target 811 using the data received from the target tracking device 110. The relative vertical motion, first relative horizontal motion, and second horizontal relative motion of the optical target 811 can be relative to a vertical motion, first horizontal motion, and second horizontal motion of the target tracking device 110 or any other location or component of the aviation system 800.

The controller 815 is configured to control the position, direction, and/or speed of the aircraft 801 using data received from the target tracking device 110. The controller 815 can use the data to maintain the aircraft 801 at a specified offset from the object 803. The controller 815 can also use the data to land the aircraft 801 on the object 803, such as on a landing position 837 of the platform 807 that is offset from the optical target 811. As an example, the controller 815 can use the data received from the target tracking device 110 to maintain the target tracking device 110 at a specified location relative to the optical target 811. The controller 815 can maintain or move the target tracking device 110 at a certain vertical position, vertical position relative to the optical target 811, first horizontal position, second horizontal position, first horizontal position relative to the optical target 811, second horizontal position and/or relative to the optical target 811. The controller 815 moves the target tracking device 110 by, for example, moving the aircraft 801. The data may also be used by the controller 815 to move the aircraft 801 in a certain direction, and at a certain speed. The controller 815 may also use the data to pay in or pay out a winch 847 of the helicopter 804 in response to motion of the vessel 805.

Figure 8B:
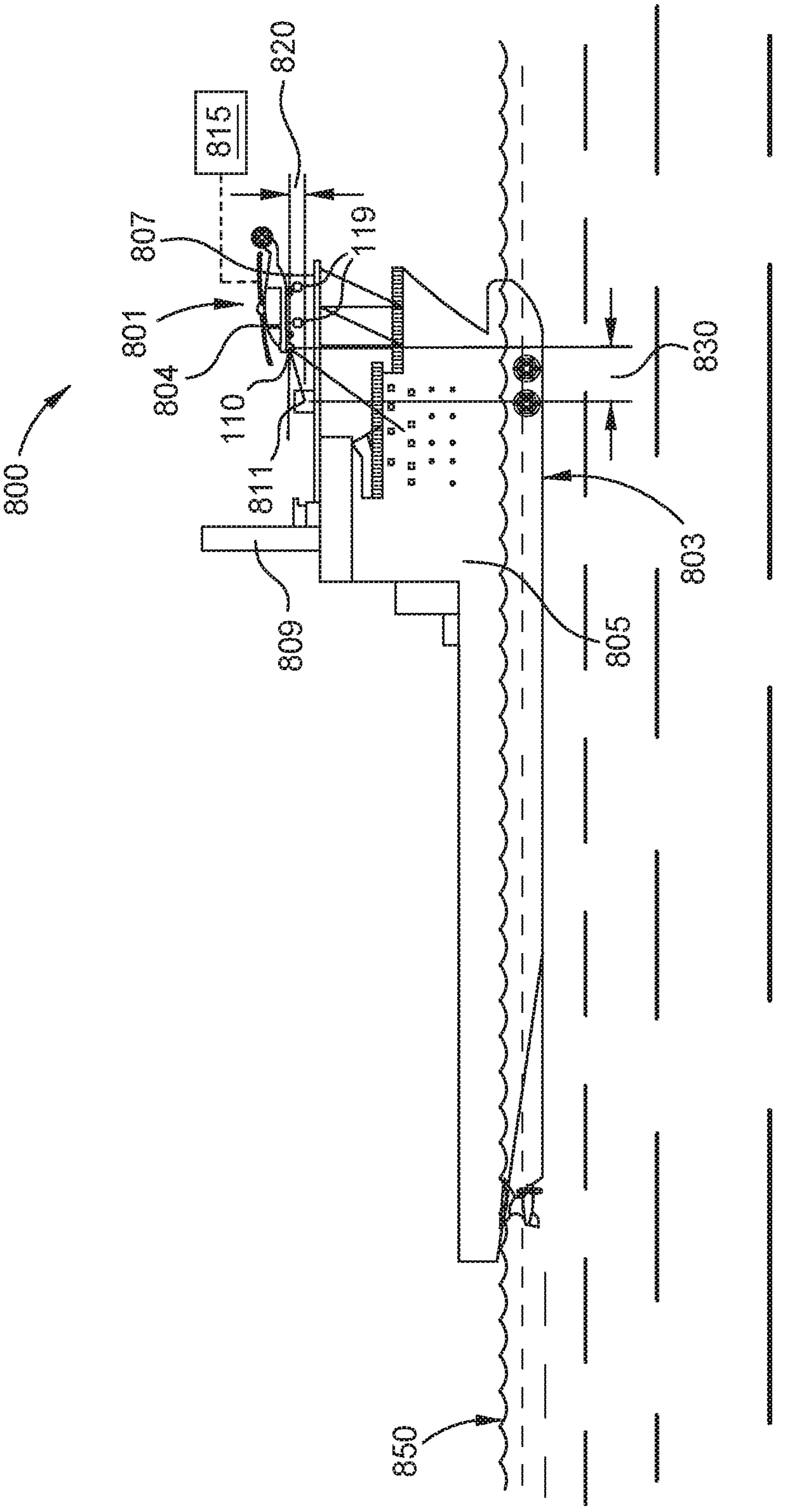
FIG. 8B is a schematic partial illustration of the aviation system illustrated in FIG. 8A, according to an implementation of the disclosure.

FIG. 8B is a schematic partial illustration of the aviation system 800 illustrated in FIG. 8A, according to an implementation of the disclosure. Using data received from the target tracking device 110, the controller 815 maintains the helicopter 804 in a hovering position. The helicopter 804 is maintained by the controller 815 at a vertical offset 820 from the optical target 811, and a horizontal offset 830 from the optical target 811. The controller may also maintain the helicopter 804 at a second horizontal offset from the optical target 811. The controller 815 is configured to maintain the horizontal offset 830, the vertical offset 820, and/or the second horizontal offset should the optical target 811 move as a result of movement of the vessel 805. The vessel 805 might move, for example, due to heave resulting from waves of the ocean 850.

The aviation system 800 allows the helicopter 804 to account for movement of the vessel 805 during aviation operations. This allows the helicopter 804 to safely and accurately land, or position itself, under varying conditions such as the heave of the vessel 805 in response to waves of the ocean 850. The helicopter 804 can also account for varying conditions when conducting operations such as lowering or raising a winch for rescue operations. Unlike configurations that can only account for movement of an object in two dimensions, the aviation system 800 can account for movement of the vessel 805 in at least three dimensions and at least six degrees of freedom. The aviation system 800 also allows for an automated landing or positioning of the helicopter 804, which saves operational time and reduces the possibility of human error interfering with operations.

Figure 9:
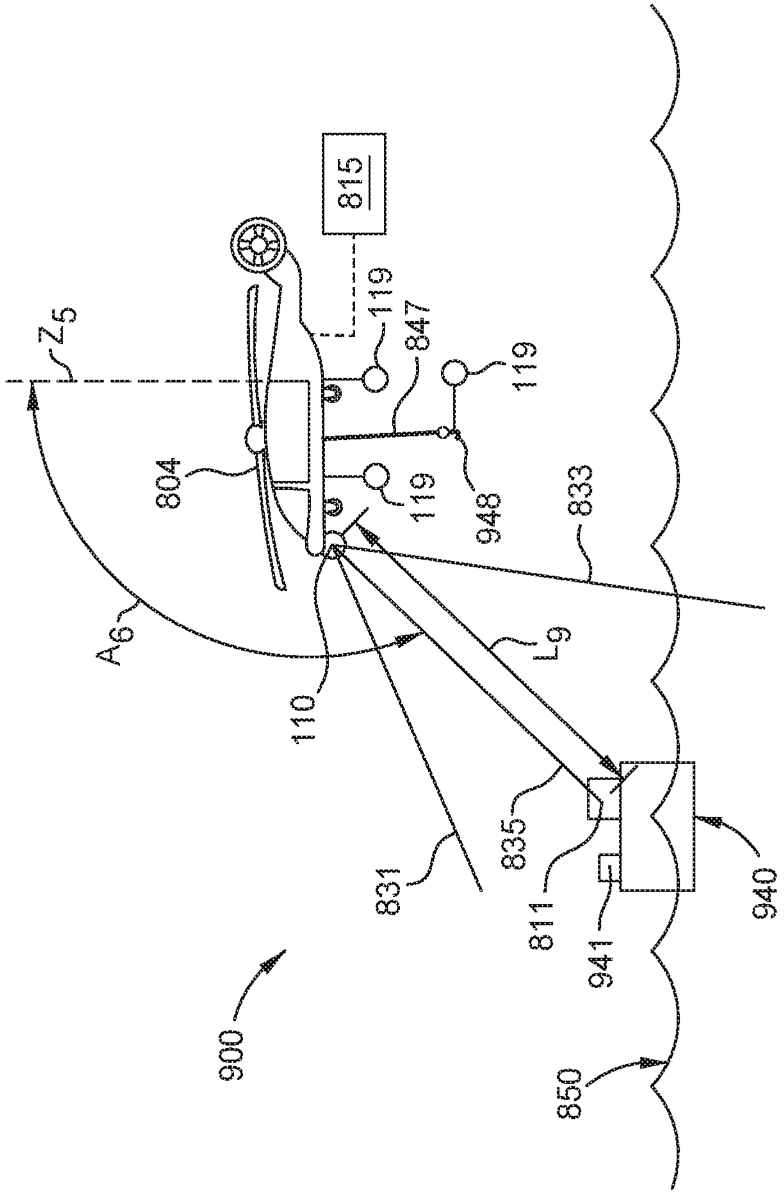
FIG. 9 is a schematic partial illustration of an aviation system, according to an implementation of the disclosure.

FIG. 9 is a schematic partial illustration of an aviation system 900, according to an implementation of the disclosure. The aviation system 900 illustrated in FIG. 9 is similar to the aviation system 800 illustrated in FIG. 8A and FIG. 8B, and may include one or more of the aspects, features, and/or components thereof. Identical numerals are identified between FIG. 9 and FIGS. 8A and 8B to identify similar components, features, and/or aspects.

In FIG. 9, the optical target 811 is disposed on an object 940 floating in the ocean 850, rather than on the vessel 805 illustrated in FIGS. 8A and 8B. The winch 847 of the helicopter 804 includes a hoist hook 948. In addition to maintaining the helicopter 804 at a specified offset from the object 940, the controller 815 is configured to facilitate controlling the winch 847. As an example, the controller 815 is configured to facilitate controlling a position of the hoist hook 948 relative to the object 940. For example, the controller 815 facilitates paying out the winch 847 toward the optical target 811 of the object 940, or toward a position 941 that is offset from the optical target 811. The controller 815 facilitates paying out the winch 848 such that the hoist hook 948 may hook an attachment of the object 940 and lift the object 940. In one example, the hoist hook 948 of the helicopter lifts the object 940 as part of rescue operations. In rescue operations, the object 940 includes one or more structures and/or one or more persons disposed thereon. In one example, the object 940 is a person and the helicopter 804 is conducting a rescue operation. It is contemplated that similar aspects may be applied to non-rescue operations.

In one example, the controller 815 is configured to maintain the hoist hook 948 at a specified offset from the optical target 811 as the object 940 moves. The hoist hook 948 is maintained at the specified offset so that a person and/or a structure can attach to the hoist hook 948 as the object 940 moves. In such an embodiment, target tracking information may be utilized to move the helicopter 804 and/or the winch 847 to guide the hook 948 into a desired position.

The aviation system 900 allows the helicopter 804 to account for movement of the object 940, and/or a person or structure disposed thereon, during rescue or other operations, such as payload acquisition. This allows the aviation system 900 to accurately position the helicopter 804 and/or the hoist hook 948 of the winch 847 in relation to the object 940, allowing the helicopter 804 to attach the object 940 and/or a structure or person disposed thereon while the object 940 moves. The aviation system 900 also allows the helicopter 804 to guide the hoist hook 948 to the object 940 while the object 940 moves. The hoist hook 948 can lift or lower the object 804 and/or a structure or person disposed thereon. The aviation system 900 can account for varying conditions during rescue operations or other operations, such as the heave of object 940 from waves of the ocean 850.

The present disclosure contemplates that the controller 815 illustrated may be configured to facilitate control of both of the helicopter 804 and the winch 847, or one of the helicopter 804 or the winch 847. As an example, the controller 815 may be configured to facilitate control of the positions of the winch 847 and the hoist hook 948 while another device, such as another controller, a flight control system of the helicopter 804, or an operator device, controls the position of the helicopter 804. In one embodiment, which can be combined with other embodiments, the controller 815 is part of the winch 847 and is configured to facilitate control of the positions of the winch 847 and the hoist hook 948 using data received from the target tracking device 110. In such an embodiment, the controller 815 is configured to facilitate control of the positions of the winch 847 and the hoist hook 948 independently of, and/or separately from, a device that controls the position of the helicopter 804. The present disclosure also contemplates that the controller 815 may include two or more controllers. In one example, the controller 815 includes a first controller configured to facilitate control of the position of the helicopter 804 and a second controller configured to facilitate control of the positions of the winch 847 and the hoist hook 948.

Unlike configurations that can only account for movement of an object in two dimensions, the aviation system 900 can account for movement of the object 940 in at least three dimensions and at least six degrees of freedom. The aviation system 900 also allows for an automated positioning of the helicopter 804 and/or hoist hook 948 in relation to the object 940, which saves operational time and reduces the possibility of human error interfering with rescue operations.

Benefits of the present disclosure include increased operational efficiencies and effectiveness; accurately and quickly tracking relative motion; tracking movement of objects in three dimensions and six degrees of freedom; accurate performance of crane operations, ship operations, aviation operations, and rescue operations; and reduced operational time.

Aspects of the present disclosure include a target tracking device, an offshore crane system, an onshore crane system, a ship system, an aviation system, and an aviation system for rescue operations. Aspects of the present disclosure also include one or more optical targets, an optical target having an RFID tag, a controller, an RFID reader, and a target tracking device that tracks a vertical motion, a first horizontal motion, and a second horizontal motion of each of the one or more optical targets.

Aspects of the present disclosure also include tracking a plurality of optical targets using a single camera, determining relative motion using positions of optical target features within images taken by the camera, determining relative motion without relying on distance measurements made by lasers, a four-axis camera, tracking a reference point offset from a plurality of optical targets, tracking optical targets having different tag patterns and/or April tags, outputting a message if one or more optical targets are outside of the field of view of the camera, and using reference tags with a target tracking device.

It is contemplated that one or more aspects of the offshore crane system, the onshore crane system, the ship system, the aviation system, and/or the aviation system for rescue operations herein may be combined. Moreover, it is contemplated that the one or more aspects of the offshore crane system, the onshore crane system, the ship system, the aviation system, and/or the aviation system for rescue operations may include some or all of the aforementioned benefits.

While the foregoing is directed to embodiments of the present disclosure, other and further embodiments of the disclosure may be devised without departing from the basic scope thereof. The present disclosure also contemplates that one or more aspects of the embodiments described herein may be substituted in for one or more of the other aspects described. The scope of the disclosure is determined by the claims that follow.

What is claimed is:

1. An onshore crane system, comprising:

one or more optical targets for disposal on one or more objects;

a target tracking device for disposal on an onshore crane, the target tracking device being configured to track the one or more optical targets, and the target tracking device comprising a camera configured to take one or more images of the one or more optical targets; and a controller that is configured to receive data from the target tracking device, and control the onshore crane using the data received from the target tracking device.

2. The onshore crane system of claim 1, wherein:

the controller is configured to calculate a relative distance between the one or more optical targets and the target tracking device using the data received from the target tracking device;

the data comprises a position of the one or more optical targets within the one or more images taken by the camera and, for each of the one or more optical targets, a relative angle measured between an axis and a line of sight from the target tracking device to one of the one or more optical targets; and the relative distance comprises:

a relative vertical distance between the one or more optical targets and the target tracking device, a first relative horizontal distance between the one or more optical targets and the target tracking device, and a second horizontal relative distance between the one or more optical targets and the target tracking device.

3. The onshore crane system of claim 1, further comprising an RFID reader in communication with one or more of the controller or the target tracking device, and an RFID tag on at least one of the one or more optical targets.

4. The onshore crane system of claim 1, wherein the controller is configured to guide a hook of the onshore crane toward at least one of the one or more optical targets, and the onshore crane system comprises one or more reference targets for disposal on the onshore crane.

5. The onshore crane system of claim 1, wherein the target tracking device is configured to scan between a first angular position and a second angular position to position the one or more optical targets within a field of view of the camera of the target tracking device, and the onshore crane system is configured to output a message if one or more of the one or more optical targets are outside of the field of view.

6. The onshore crane system of claim 1, wherein the one or more objects comprise a first object and a second object, and the one or more optical targets comprise a first optical target on the first object and a second optical target on the second object, the first optical target comprising a first tag pattern and the second optical target comprising a second tag pattern that is different than the first tag pattern.

7. A ship system, comprising:

one or more optical targets for disposal on an object;

a target tracking device for disposal on a vessel, the target tracking device being configured to track the one or more optical targets, and the target tracking device comprising a camera configured to take one or more images of the one or more optical targets; and a controller that is configured to receive data from the target tracking device, calculate a relative motion between the target tracking device and the one or more optical targets using the data received from the target tracking device, and control the vessel using the relative motion.

8. The ship system of claim 7, wherein the object is a second vessel, an offshore platform, or a dock, and the ship system comprises one or more reference targets for disposal on the vessel.

9. The ship system of claim 7, further comprising an RFID reader in communication with one or more of the controller or the target tracking device, and an RFID tag on at least one of the one or more optical targets.

10. The ship system of claim 7, wherein the data comprises a position of the one or more optical targets within the one or more images taken by the camera, and the relative motion comprises:

a relative vertical motion between the one or more optical targets and the target tracking device;

a first relative horizontal motion between the one or more optical targets and the target tracking device; and a second horizontal relative motion between the one or more optical targets and the target tracking device.

11. The ship system of claim 7, wherein the target tracking device is configured to scan between a first angular position and a second angular position to position the one or more optical targets within a field of view of the camera of the target tracking device, and the ship system is configured to output a message if one or more of the one or more optical targets are outside of the field of view.

12. The ship system of claim 7, wherein the one or more optical targets comprise a first optical target on the object and a second optical target on the object, the first optical target comprising a first tag pattern and the second optical target comprising a second tag pattern that is different than the first tag pattern.

13. The ship system of claim 7, wherein the controller is configured to guide the vessel toward the one or more optical targets using the relative motion.

14. The ship system of claim 7, wherein the controller is configured to maintain the vessel at an offset distance and an offset angle from the one or more optical targets using the relative motion.

15. An offshore crane system, comprising:

one or more optical targets for disposal on a first vessel;

a target tracking device for disposal on a crane disposed on a second vessel, the target tracking device being configured to track the one or more optical targets, and the target tracking device comprising a camera configured to take one or more images of the one or more optical targets; and a controller that is configured to receive data from the target tracking device, and control the crane using the data received from the target tracking device.

16. The offshore crane system of claim 15, wherein:

the controller is configured to calculate a relative motion between the one or more optical targets and the target tracking device using the data received from the target tracking device;

the data comprises a position of the one or more optical targets within the one or more images taken by the camera and, for each of the one or more optical targets, a relative angle measured between an axis and a line of sight from the target tracking device to one of the one or more optical targets; and the relative motion comprises:

a relative vertical motion between the one or more optical targets and the target tracking device, a first relative horizontal motion between the one or more optical targets and the target tracking device, and a second horizontal relative motion between the one or more optical targets and the target tracking device.

17. The offshore crane system of claim 15, further comprising an RFID reader in communication with one or more of the controller or the target tracking device, and an RFID tag on at least one of the one or more optical targets.

18. The offshore crane system of claim 15, wherein the controller is configured to guide a hook of the crane toward at least one of the one or more optical targets, and the offshore crane system comprises one or more reference targets for disposal on the second vessel.

19. The offshore crane system of claim 15, wherein the target tracking device is configured to scan between a first angular position and a second angular position to position the one or more optical targets within a field of view of the camera of the target tracking device, and the offshore crane system is configured to output a message if one or more of the one or more optical targets are outside of the field of view.

20. The offshore crane system of claim 15, wherein the one or more optical targets comprise a first optical target on the first vessel and a second optical target on the second vessel, the first optical target comprising a first tag pattern and the second optical target comprising a second tag pattern that is different than the first tag pattern.

* * * * *